US012630427B2

(12) United States Patent
Johnson et al.

(10) Patent No.: US 12,630,427 B2
(45) Date of Patent: May 19, 2026

(54) BROMINE DOPED CARBON-BASED NANOMATERIAL AND METHODS OF FORMING THE SAME

(71) Applicant: NABORS ENERGY TRANSITION SOLUTIONS LLC, Houston, TX (US)

(72) Inventors: Evan Johnson, Spring, TX (US); Paul Yollin, Tomball, TX (US); Dylan Cook, Spring, TX (US)

(73) Assignee: NABORS ENERGY TRANSITION SOLUTIONS LLC, Houston, TX (US)

( * ) Notice: Subject to any disclaimer, the term of this patent is extended or adjusted under 35 U.S.C. 154(b) by 604 days.

(21) Appl. No.: 18/176,528

(22) Filed: Mar. 1, 2023

(65) Prior Publication Data

US 2023/0278863 A1     Sep. 7, 2023

Related U.S. Application Data

(60) Provisional application No. 63/268,880, filed on Mar. 4, 2022.

(51) Int. Cl.
*C01B 32/154*          (2017.01)

(52) U.S. Cl.
CPC ........ *C01B 32/154* (2017.08); *C01P 2002/54* (2013.01); *C01P 2004/62* (2013.01); *C01P 2004/64* (2013.01)

(58) Field of Classification Search
CPC ............... C01B 32/154; C01P 2002/54; C01P 2004/62; C01P 2004/64
See application file for complete search history.

(56) References Cited

U.S. PATENT DOCUMENTS

| | | | |
|---|---|---|---|
| 2,121,463 A | 6/1938 | Wisdom | |
| 5,132,105 A | 7/1992 | Remo | |
| 6,331,209 B1 | 12/2001 | Jang et al. | |
| 6,350,488 B1 | 2/2002 | Lee et al. | |
| 6,514,113 B1 | 2/2003 | Lee et al. | |
| 6,648,711 B1 | 11/2003 | Jang et al. | |
| 6,759,025 B2 | 7/2004 | Hong et al. | |
| 7,118,440 B2 | 10/2006 | Kuo et al. | |
| 7,452,735 B2 | 11/2008 | Li et al. | |
| 7,462,498 B2 | 12/2008 | Mao et al. | |
| 7,611,906 B2 | 11/2009 | Yaniv | |
| 7,619,257 B2 | 11/2009 | Pfeiffer | |
| 7,781,061 B2 | 8/2010 | Garcia et al. | |
| 8,007,588 B2 | 8/2011 | Ito et al. | |
| 8,062,697 B2 | 11/2011 | Yaniv et al. | |
| 8,129,463 B2 | 3/2012 | Mao et al. | |
| 8,455,047 B2 | 6/2013 | Li et al. | |
| 8,668,952 B2 | 3/2014 | Hikata et al. | |
| 8,784,663 B2 | 7/2014 | Wei et al. | |
| 8,803,636 B2 | 8/2014 | Ermolov | |
| 8,865,268 B2 | 10/2014 | Haque et al. | |
| 8,952,477 B2 | 2/2015 | Yamada et al. | |
| 9,080,928 B2 | 7/2015 | Borini et al. | |

| | | | |
|---|---|---|---|
| 9,099,252 B2 | 8/2015 | Liu et al. | |
| 9,202,639 B2 | 12/2015 | Wei et al. | |
| 9,290,389 B2 | 3/2016 | Haque et al. | |
| 9,362,565 B2 | 6/2016 | Wei et al. | |
| 9,380,979 B2 | 7/2016 | White et al. | |
| 9,406,985 B2 | 8/2016 | Amaratunga et al. | |
| 9,413,032 B2 | 8/2016 | Wei et al. | |
| 9,440,857 B2 | 9/2016 | Sorensen et al. | |
| 9,440,858 B2 | 9/2016 | Lipka et al. | |
| 9,446,965 B2 | 9/2016 | Kverel et al. | |
| 9,490,658 B2 | 11/2016 | Wei et al. | |
| 9,496,435 B2 | 11/2016 | Wang et al. | |
| 9,601,763 B2 | 3/2017 | Fang et al. | |
| 9,660,003 B2 | 5/2017 | Sato et al. | |
| 9,670,066 B2 | 6/2017 | Lipka et al. | |
| 9,676,621 B2 | 6/2017 | Chen et al. | |
| 9,761,380 B2 | 9/2017 | Wei et al. | |
| 9,765,271 B2 | 9/2017 | Myrick | |
| 9,767,992 B1 | 9/2017 | Stowell et al. | |
| 9,782,739 B2 | 10/2017 | Laine | |
| 9,786,444 B2 | 10/2017 | Hiralal et al. | |
| 9,824,789 B2 | 11/2017 | Pei et al. | |
| 9,859,515 B2 | 1/2018 | Hammond et al. | |
| 9,862,602 B1 | 1/2018 | Riso et al. | |
| 9,862,606 B1 | 1/2018 | Cook et al. | |
| 9,887,352 B2 | 2/2018 | Bessonov et al. | |
| 9,905,373 B2 | 2/2018 | Zhamu et al. | |
| 9,917,299 B2 | 3/2018 | Behan et al. | |
| 9,923,206 B2 | 3/2018 | Chen et al. | |
| 9,925,559 B2 | 3/2018 | Lee et al. | |
| 9,945,765 B2 | 4/2018 | White et al. | |
| 9,978,940 B2 | 5/2018 | Bessonov et al. | |
| 9,997,334 B1 | 6/2018 | Anzelmo et al. | |
| 9,997,784 B2 | 6/2018 | Su et al. | |
| 10,069,139 B2 | 9/2018 | Wang et al. | |
| 10,294,133 B2 | 5/2019 | Hashim et al. | |
| 10,316,215 B2 | 6/2019 | Castaño Meneses | |

(Continued)

FOREIGN PATENT DOCUMENTS

| | | |
|---|---|---|
| AU | 2018201650 A1 | 9/2018 |
| AU | 2021361326 A1 | 5/2023 |

(Continued)

OTHER PUBLICATIONS

Zou et al., "A composite consisting of bromine-doped carbon dots and ferric ions as a fluorescent probe for determination and intracellular imaging of phosphate" Microchimica Acta 186, Jul. 2019, 1-9 (Year: 2019).*

(Continued)

*Primary Examiner* — Anthony J Zimmer
*Assistant Examiner* — Abdul-Rahman Yusuf Waleed Smari
(74) *Attorney, Agent, or Firm* — Abel Schillinger, LLP

(57) ABSTRACT

The present disclosure relates to a carbon-based nanomaterial composition that may be formed from a gas mixture and a bromine powder. The gas mixture may include a carbon-based gas, an oxygen gas, and a hydrogen gas. The carbon-based nanomaterial composition may include bromine doped nanospheres.

19 Claims, 3 Drawing Sheets

(56) References Cited

U.S. PATENT DOCUMENTS

| | | |
|---|---|---|
| 10,326,135 B2 | 6/2019 | Fasching et al. |
| 10,364,401 B2 | 7/2019 | Soto-Castillo et al. |
| 10,401,701 B2 | 9/2019 | Coklin et al. |
| 10,416,519 B2 | 9/2019 | Conklin et al. |
| 10,428,197 B2 | 10/2019 | Anzelmo et al. |
| 10,465,128 B2 | 11/2019 | Cruz et al. |
| 10,472,497 B2 | 11/2019 | Stowell et al. |
| 10,502,705 B2 | 12/2019 | Stowell et al. |
| 10,611,979 B2 | 4/2020 | Diloyan et al. |
| 10,637,043 B2 | 4/2020 | Zhamu et al. |
| 10,665,724 B2 | 5/2020 | Pohjonen et al. |
| 10,690,047 B1 | 6/2020 | LaStella |
| 10,734,653 B2 | 8/2020 | Lanning et al. |
| 10,756,334 B2 | 8/2020 | Stowell et al. |
| 10,781,103 B2 | 9/2020 | Tanner et al. |
| 10,819,313 B2 | 10/2020 | Voutilainen |
| 10,822,542 B2 | 11/2020 | Zhong et al. |
| 10,847,704 B2 | 11/2020 | Sugiura et al. |
| 10,858,755 B2 | 12/2020 | Kula et al. |
| 10,920,035 B2 | 2/2021 | Rogojina et al. |
| 10,943,076 B2 | 3/2021 | Stowell et al. |
| 10,982,119 B2 | 4/2021 | El-Kady et al. |
| 11,045,427 B2 | 6/2021 | John et al. |
| 11,107,662 B2 | 8/2021 | Stowell et al. |
| 11,120,977 B2 | 9/2021 | Fabien et al. |
| 11,127,941 B2 | 9/2021 | Lanning et al. |
| 11,127,942 B2 | 9/2021 | Gazda et al. |
| 11,133,495 B2 | 9/2021 | Gazda et al. |
| 11,137,368 B2 | 10/2021 | Stowell et al. |
| 11,198,611 B2 | 12/2021 | Lanning et al. |
| 11,222,756 B2 | 1/2022 | Tang et al. |
| 11,224,859 B2 | 1/2022 | Rong et al. |
| 11,309,545 B2 | 4/2022 | Kumar et al. |
| 11,335,911 B2 | 5/2022 | Lanning et al. |
| 11,342,561 B2 | 5/2022 | Rogojina et al. |
| 11,352,481 B2 | 6/2022 | Stowell et al. |
| 11,367,895 B1 | 6/2022 | Shan et al. |
| 11,398,622 B2 | 7/2022 | Gazda et al. |
| 11,404,692 B1 | 8/2022 | Lanning et al. |
| 11,433,369 B1 | 9/2022 | Nicole et al. |
| 11,446,966 B2 | 9/2022 | Stowell et al. |
| 11,479,062 B2 | 10/2022 | Stowell et al. |
| 11,489,161 B2 | 11/2022 | Kumar et al. |
| 11,508,966 B2 | 11/2022 | Bell et al. |
| 11,511,997 B2 | 11/2022 | Lim et al. |
| 11,539,074 B2 | 12/2022 | Rogojina et al. |
| 11,553,630 B2 | 1/2023 | Kaner et al. |
| 11,555,748 B2 | 1/2023 | Stowell et al. |
| 11,555,761 B1 | 1/2023 | Stowell |
| 11,555,799 B2 | 1/2023 | Lanning et al. |
| 11,585,731 B2 | 2/2023 | Stowell et al. |
| 11,591,457 B1 | 2/2023 | Khan et al. |
| 11,592,279 B2 | 2/2023 | Stowell et al. |
| 11,600,876 B2 | 3/2023 | Gazda |
| 11,613,817 B2 | 3/2023 | Stowell et al. |
| 11,623,197 B2 | 4/2023 | Stowell et al. |
| 11,631,893 B2 | 4/2023 | Rogojina et al. |
| 11,656,070 B2 | 5/2023 | Stowell et al. |
| 11,670,826 B2 | 6/2023 | Gazda |
| 11,674,031 B1 | 6/2023 | Anzelmo et al. |
| 11,680,012 B2 | 6/2023 | Stowell et al. |
| 11,688,895 B1 | 6/2023 | Gibbs et al. |
| 11,719,582 B2 | 8/2023 | Stowell et al. |
| 11,735,745 B2 | 8/2023 | Vanheusden et al. |
| 11,739,409 B2 | 8/2023 | Stowell et al. |
| 11,761,057 B1 | 9/2023 | Stowell et al. |
| 11,796,883 B2 | 10/2023 | Conklin et al. |
| 11,814,292 B2 | 11/2023 | El-Kady et al. |
| 11,897,768 B2 | 2/2024 | Ashton et al. |
| 12,371,326 B2 | 7/2025 | Johnson et al. |
| 2006/0062715 A1 | 3/2006 | Endo et al. |
| 2006/0078730 A1 | 4/2006 | Tsukada et al. |
| 2006/0093545 A1 | 5/2006 | Maruyama et al. |
| 2006/0196763 A1 | 9/2006 | Choi et al. |
| 2006/0216517 A1 | 9/2006 | Handa et al. |
| 2006/0217025 A1 | 9/2006 | Hsiao et al. |
| 2006/0263588 A1 | 11/2006 | Handa et al. |
| 2008/0241047 A1 | 10/2008 | Asano |
| 2008/0254296 A1 | 10/2008 | Handa et al. |
| 2009/0035570 A1 | 2/2009 | Mao et al. |
| 2009/0047428 A1 | 2/2009 | Shan et al. |
| 2009/0121606 A1 | 5/2009 | Okubo et al. |
| 2009/0124746 A1 | 5/2009 | Handa et al. |
| 2009/0131575 A1 | 5/2009 | Handa et al. |
| 2009/0135042 A1 | 5/2009 | Umishita et al. |
| 2009/0152508 A1 | 6/2009 | Handa et al. |
| 2009/0162636 A1 | 6/2009 | Shan et al. |
| 2009/0226712 A1 | 9/2009 | Handa et al. |
| 2009/0247796 A1 | 10/2009 | Waycuilis et al. |
| 2009/0261186 A1 | 10/2009 | Fink et al. |
| 2009/0263642 A1 | 10/2009 | Handa et al. |
| 2009/0292057 A1 | 11/2009 | Handa et al. |
| 2010/0149018 A1 | 6/2010 | Umishita et al. |
| 2010/0181534 A1 | 7/2010 | Shenderova et al. |
| 2010/0310447 A1 | 12/2010 | Yaniv et al. |
| 2011/0027603 A1 | 2/2011 | Yaniv et al. |
| 2011/0045273 A1 | 2/2011 | Handa et al. |
| 2011/0147647 A1 | 6/2011 | Yaniv et al. |
| 2011/0175065 A1 | 7/2011 | de la Vega et al. |
| 2012/0082787 A1 | 4/2012 | Fujita |
| 2012/0315482 A1 | 12/2012 | Muramatsu et al. |
| 2013/0316092 A1 | 11/2013 | Chen et al. |
| 2014/0216942 A1 | 8/2014 | Jiang et al. |
| 2014/0235513 A1 | 8/2014 | Kverel et al. |
| 2014/0335010 A1 | 11/2014 | Sorensen et al. |
| 2015/0004667 A1 | 1/2015 | McKinney et al. |
| 2015/0017699 A1 | 1/2015 | McKinney et al. |
| 2015/0047687 A1 | 2/2015 | Conklin et al. |
| 2015/0047697 A1 | 2/2015 | Conklin et al. |
| 2015/0047882 A1 | 2/2015 | Jiang et al. |
| 2015/0060817 A1 | 3/2015 | Sato et al. |
| 2015/0155127 A1 | 6/2015 | Fink et al. |
| 2016/0130149 A1 | 5/2016 | Shankman |
| 2016/0225991 A1 | 8/2016 | Schwab et al. |
| 2016/0240861 A1 | 8/2016 | Kurungot et al. |
| 2016/0329586 A1 | 11/2016 | Ninan et al. |
| 2017/0179314 A1 | 6/2017 | Novoselov et al. |
| 2017/0278643 A1 | 9/2017 | El-Kady et al. |
| 2018/0207591 A1 | 7/2018 | Yu et al. |
| 2018/0248175 A1 | 8/2018 | Ghezelbash et al. |
| 2018/0261847 A1 | 9/2018 | Su et al. |
| 2018/0265359 A1 | 9/2018 | Cross |
| 2018/0305570 A1 | 10/2018 | El-Kady et al. |
| 2018/0320586 A1 | 11/2018 | Johnson et al. |
| 2018/0346337 A1 | 12/2018 | Tour et al. |
| 2018/0366280 A1 | 12/2018 | Hwang et al. |
| 2018/0370801 A1 | 12/2018 | Patole |
| 2019/0031906 A1 | 1/2019 | Kim et al. |
| 2019/0039907 A1 | 2/2019 | Zeng et al. |
| 2019/0048161 A1 | 2/2019 | Zeng et al. |
| 2019/0088420 A1 | 3/2019 | Tour et al. |
| 2019/0100658 A1 | 4/2019 | Taylor et al. |
| 2019/0109317 A1 | 4/2019 | Zhou et al. |
| 2019/0161352 A1 | 5/2019 | Price |
| 2020/0040444 A1 | 2/2020 | Stowell et al. |
| 2020/0066474 A1 | 2/2020 | Lorr et al. |
| 2020/0112026 A1 | 4/2020 | Tour et al. |
| 2020/0173045 A1 | 6/2020 | Chen et al. |
| 2020/0243846 A1 | 7/2020 | He et al. |
| 2020/0246179 A1 | 8/2020 | Peyman |
| 2020/0274181 A1 | 8/2020 | Park et al. |
| 2020/0294779 A1 | 9/2020 | Ashton et al. |
| 2020/0294780 A1 | 9/2020 | Ashton et al. |
| 2020/0298174 A1 | 9/2020 | Boudreault |
| 2020/0302328 A1 | 9/2020 | Nafradi et al. |
| 2020/0369526 A1 | 11/2020 | Ladislaus et al. |
| 2020/0402768 A1 | 12/2020 | Stowell et al. |
| 2021/0017031 A1 | 1/2021 | Hardman et al. |
| 2021/0053829 A1 | 2/2021 | Tanner et al. |
| 2021/0114886 A1 | 4/2021 | Rohani et al. |
| 2021/0172904 A1 | 6/2021 | Stowell et al. |
| 2021/0172905 A1 | 6/2021 | Stowell et al. |
| 2021/0181145 A1 | 6/2021 | Stowell et al. |
| 2021/0181146 A1 | 6/2021 | Stowell et al. |

(56) References Cited

U.S. PATENT DOCUMENTS

| | | |
|---|---|---|
| 2021/0210753 A1 | 7/2021 | Gazda et al. |
| 2021/0218110 A1 | 7/2021 | Lanning et al. |
| 2021/0226225 A1 | 7/2021 | Lanning et al. |
| 2021/0226302 A1 | 7/2021 | Lanning et al. |
| 2021/0238040 A1 | 8/2021 | Opoku et al. |
| 2021/0242505 A1 | 8/2021 | Gazda et al. |
| 2021/0257666 A1 | 8/2021 | Huang et al. |
| 2021/0257667 A1 | 8/2021 | Gazda et al. |
| 2021/0359306 A1 | 11/2021 | Rogojina et al. |
| 2021/0359308 A1 | 11/2021 | Huang et al. |
| 2021/0396708 A1 | 12/2021 | Lim et al. |
| 2021/0396709 A1 | 12/2021 | Lim et al. |
| 2021/0401685 A1 | 12/2021 | Martínez Rovira et al. |
| 2022/0030874 A1 | 2/2022 | Castaño Meneses et al. |
| 2022/0091066 A1 | 3/2022 | Lim et al. |
| 2022/0185676 A1 | 6/2022 | Mahiko et al. |
| 2022/0263111 A1 | 8/2022 | Li et al. |
| 2022/0271291 A1 | 8/2022 | Li et al. |
| 2022/0274062 A1 | 9/2022 | Moxon et al. |
| 2022/0320515 A1 | 10/2022 | Rogojina et al. |
| 2022/0380218 A1 | 12/2022 | Johnson et al. |
| 2022/0407046 A1 | 12/2022 | Gazda et al. |
| 2023/0017082 A1 | 1/2023 | Stowell et al. |
| 2023/0019088 A1 | 1/2023 | Montalvo et al. |
| 2023/0021737 A1 | 1/2023 | Stowell et al. |
| 2023/0031884 A1 | 2/2023 | Bugga et al. |
| 2023/0035035 A1 | 2/2023 | Rogojina et al. |
| 2023/0035506 A1 | 2/2023 | Rogojina et al. |
| 2023/0040722 A1 | 2/2023 | Stowell et al. |
| 2023/0069456 A1 | 3/2023 | Stowell et al. |
| 2023/0074143 A1 | 3/2023 | Stowell et al. |
| 2023/0109645 A1 | 4/2023 | Stowell et al. |
| 2023/0145800 A1 | 5/2023 | Stowell et al. |
| 2023/0147825 A1 | 5/2023 | Stowell et al. |
| 2023/0187744 A1 | 6/2023 | Gazda |
| 2023/0192491 A1 | 6/2023 | Johnson et al. |
| 2023/0192493 A1 | 6/2023 | Johnson et al. |
| 2023/0192495 A1 | 6/2023 | Johnson et al. |
| 2023/0193040 A1 | 6/2023 | Johnson et al. |
| 2023/0193041 A1 | 6/2023 | Johnson et al. |
| 2023/0212729 A1 | 7/2023 | Stowell et al. |
| 2023/0275257 A1 | 8/2023 | Bell et al. |
| 2023/0278864 A1 | 9/2023 | Johnson et al. |
| 2023/0278865 A1 | 9/2023 | Johnson et al. |
| 2023/0278866 A1 | 9/2023 | Johnson et al. |
| 2023/0278867 A1 | 9/2023 | Johnson et al. |
| 2023/0278869 A1 | 9/2023 | Johnson et al. |
| 2023/0278870 A1 | 9/2023 | Johnson et al. |
| 2023/0278871 A1 | 9/2023 | Johnson et al. |
| 2023/0278872 A1 | 9/2023 | Johnson et al. |
| 2023/0278873 A1 | 9/2023 | Johnson et al. |
| 2023/0287197 A1 | 9/2023 | Anzelmo et al. |
| 2023/0296479 A1 | 9/2023 | Stowell et al. |
| 2023/0373866 A1 | 11/2023 | Johnson et al. |
| 2023/0373867 A1 | 11/2023 | Johnson et al. |
| 2023/0382736 A1 | 11/2023 | Johnson et al. |
| 2023/0392541 A1 | 12/2023 | Johnson et al. |
| 2023/0399564 A1 | 12/2023 | Edler et al. |
| 2024/0052954 A1 | 2/2024 | Banerji et al. |
| 2024/0180960 A1 | 6/2024 | Petrello et al. |
| 2024/0181060 A1 | 6/2024 | Johnson et al. |
| 2024/0181061 A1 | 6/2024 | Johnson et al. |

FOREIGN PATENT DOCUMENTS

| | | |
|---|---|---|
| BY | 10010 C1 | 12/2007 |
| BY | 21633 C1 | 2/2018 |
| CN | 105600780 A | 5/2016 |
| CN | 106328909 A | 1/2017 |
| CN | 106532026 A | 3/2017 |
| CN | 107416819 A | 12/2017 |
| CN | 107579203 A | 1/2018 |
| CN | 108199058 A | 6/2018 |
| CN | 108658061 A | 10/2018 |
| CN | 108946710 A | 12/2018 |
| CN | 110327372 A | 10/2019 |
| CN | 110451514 A | 11/2019 |
| CN | 110734077 A | 1/2020 |
| CN | 110787827 A | 2/2020 |
| CN | 108383102 B | 4/2020 |
| CN | 108946710 B | 4/2020 |
| CN | 111186830 A | 5/2020 |
| CN | 111196602 A | 5/2020 |
| CN | 111467499 A | 7/2020 |
| CN | 112079349 A | 12/2020 |
| CN | 109200059 B | 3/2021 |
| CN | 112645312 A | 4/2021 |
| CN | 116043186 A | 5/2023 |
| CN | 116075361 A | 5/2023 |
| CN | 116234942 A | 6/2023 |
| EA | 11588 B1 | 4/2009 |
| EP | 2857550 A1 | 4/2015 |
| EP | 3213349 B1 | 6/2019 |
| EP | 2489088 B1 | 7/2019 |
| EP | 4230774 A1 | 8/2023 |
| EP | 3914744 B1 | 12/2023 |
| GB | 2618142 A | 11/2023 |
| JP | 5078173 A | 3/1993 |
| JP | H05070115 A | 3/1993 |
| JP | 2003335508 A | 11/2003 |
| JP | 2004526652 A | 9/2004 |
| JP | 2009274952 A | 11/2009 |
| JP | 2010052972 A | 3/2010 |
| JP | 5578640 B2 | 8/2014 |
| JP | 2015050245 A | 3/2015 |
| JP | 2015189606 A | 11/2015 |
| JP | 6097908 B2 | 3/2017 |
| JP | 2017045639 A | 3/2017 |
| JP | 2017197424 A | 11/2017 |
| JP | 2018504341 A | 2/2018 |
| JP | 2018037617 A | 3/2018 |
| JP | 2018048368 A | 3/2018 |
| JP | 6455942 B2 | 1/2019 |
| JP | 2020506153 A | 2/2020 |
| JP | 6754355 B2 | 9/2020 |
| JP | 2021120331 A | 8/2021 |
| JP | 6934149 B2 | 9/2021 |
| JP | 7041421 B2 | 3/2022 |
| KR | 1020110030570 A | 3/2011 |
| KR | 101451140 B1 | 10/2014 |
| KR | 20150121680 A | 10/2015 |
| KR | 1020150124636 A | 11/2015 |
| KR | 1020160050926 A | 5/2016 |
| KR | 20170044836 A | 4/2017 |
| KR | 1020200039715 A | 4/2020 |
| KR | 20210088074 A | 7/2021 |
| KR | 20210105107 A | 8/2021 |
| KR | 20210113319 A | 9/2021 |
| KR | 1020210144756 A | 11/2021 |
| RU | 2393276 C1 | 6/2010 |
| RU | 2591942 C2 | 7/2016 |
| RU | 2641829 C1 | 1/2018 |
| RU | 2658036 C1 | 6/2018 |
| TW | 201834965 A | 10/2018 |
| TW | 202104076 A | 2/2021 |
| TW | 202218224 A | 5/2022 |
| WO | 2010049637 A1 | 5/2010 |
| WO | 2010110153 A1 | 9/2010 |
| WO | 2014011402 A1 | 1/2014 |
| WO | 2014052376 A1 | 4/2014 |
| WO | 2014077507 A1 | 5/2014 |
| WO | 2015009758 A1 | 1/2015 |
| WO | 2015025147 A1 | 2/2015 |
| WO | 2015049624 A1 | 4/2015 |
| WO | 2015059718 A1 | 4/2015 |
| WO | 2016002277 A1 | 1/2016 |
| WO | 2016011223 A1 | 1/2016 |
| WO | 2016175195 A1 | 11/2016 |
| WO | 2017009040 A1 | 1/2017 |
| WO | 2018148044 A2 | 8/2018 |
| WO | 2019014212 A1 | 1/2019 |
| WO | 2019126782 A1 | 6/2019 |
| WO | 2020092449 A1 | 5/2020 |
| WO | 2020257229 A2 | 12/2020 |

(56) References Cited

FOREIGN PATENT DOCUMENTS

| WO | 2021080664 A1 | 4/2021 |
|----|---------------|--------|
| WO | 2021158395 A1 | 8/2021 |
| WO | 2021168444 A1 | 8/2021 |
| WO | 2021183931 A1 | 9/2021 |
| WO | 2021237282 A1 | 12/2021 |
| WO | 2022080142 A1 | 4/2022 |
| WO | 2022086611 A1 | 4/2022 |
| WO | 2022212114 A1 | 10/2022 |
| WO | 2022216403 A1 | 10/2022 |
| WO | 2022223668 A1 | 10/2022 |
| WO | 2022246443 A1 | 11/2022 |
| WO | 2022266393 A1 | 12/2022 |
| WO | 2023003893 A1 | 1/2023 |
| WO | 2023004060 A2 | 1/2023 |
| WO | 2023023187 A1 | 2/2023 |
| WO | 2023039204 A1 | 3/2023 |
| WO | 2023090990 A1 | 5/2023 |
| WO | 2023122652 A1 | 6/2023 |
| WO | 2023122658 A1 | 6/2023 |
| WO | 2023122660 A1 | 6/2023 |
| WO | 2023122664 A1 | 6/2023 |
| WO | 2023122668 A1 | 6/2023 |
| WO | 2023168219 A1 | 9/2023 |
| WO | 2023168220 A1 | 9/2023 |
| WO | 2023168221 A1 | 9/2023 |
| WO | 2023168223 A1 | 9/2023 |
| WO | 2023168224 A1 | 9/2023 |
| WO | 2023168225 A1 | 9/2023 |
| WO | 2023168228 A1 | 9/2023 |
| WO | 2023168229 A1 | 9/2023 |
| WO | 2023168230 A1 | 9/2023 |
| WO | 2023168231 A1 | 9/2023 |
| WO | 2023168263 A1 | 9/2023 |
| WO | 2023173027 A1 | 9/2023 |
| WO | 2023173045 A1 | 9/2023 |
| WO | 2023225285 A1 | 11/2023 |
| WO | 2023225290 A1 | 11/2023 |
| WO | 2023229933 A1 | 11/2023 |
| WO | 2024123779 A1 | 6/2024 |
| WO | 2024123782 A1 | 6/2024 |
| WO | 2024123787 A1 | 6/2024 |

OTHER PUBLICATIONS

Zhou et al., "Facile synthesis of halogenated carbon quantum dots as an important intermediate for surface modification" RSC Adv., Apr. 3, 2013, 9625-9628 (Year: 2013).*

Knoblauch et al., "Heavy carbon nanodots: a new phosphorescent carbon nanostructure" Phys. Chem. Chem. Phys., May 20, 2018, 15518-15527 (Year: 2018).*

International Preliminary Report on Patentability for PCT Application No. PCT/US2023/082529, dated Jun. 19, 2025, 9 pages.

International Preliminary Report on Patentability for PCT Application No. PCT/US2023/082535, dated Jun. 19, 2025, 8 pages.

International Preliminary Report on Patentability for PCT Application No. PCT/US2023/082541, dated Jun. 19, 2025, 8 pages.

International Search Report and Written Opinion for PCT Application No. PCT/US2022/072424, dated Sep. 6, 2022, 9 pages.

Hassani, et al., A simple synthesis of sulfur-doped graphene using sulfur powder by chemical vapor deposition, RDC Adv. 2016; 6: 27159-27163 (Year: 2016).

International Preliminary Report on Patentability for PCT Application No. PCT/US2023/063428, dated Sep. 19, 2024, 6 pages.

International Preliminary Report on Patentability for PCT Application No. PCT/US2023/063430, dated Sep. 19, 2024, 8 pages.

International Preliminary Report on Patentability for PCT Application No. PCT/US2023/063431, dated Sep. 19, 2024, 8 pages.

Nepal, et al., One-step synthesisof graphene via catalyst-free gas-phase hydrocarbon detonation, Nanotechnology 2013; 24: 245602, pp. 1-7, with Supporting Information. (Year 2013).

International Search Report and Written Opinion for PCT Application No. PCT/US2022/082122, dated Apr. 19, 2023, 11 pages.

International Search Report and Written Opinion for PCT Application No. PCT/US2022/082130, dated Apr. 20, 2023, 13 pages.

International Search Report and Written Opinion for PCT Application No. PCT/US2022/082134, dated Apr. 19, 2023, 11 pages.

International Search Report and Written Opinion for PCT Application No. PCT/US2022/082138, dated May 1, 2023, 11 pages.

Nitze, Florian et al., "Sulfur-doped ordered mesoporous carbons: a stability-improving sulfur host for lithium-sulfer battery cathodes," Journal of Power Sources, 317, dated 2016, pp. 112-119.

International Search Report and Written Opinion for PCT Application No. PCT/US2022/082142, dated May 1, 2023, 12 pages.

International Search Report and Written Opinion for PCT Application No. PCT/US2023/082529, dated Apr. 9, 2024, 13 pages.

International Search Report and Written Opinion for PCT Application No. PCT/US2023/082535, dated Apr. 24, 2024, 11 pages.

International Search Report and Written Opinion for PCT Application No. PCT/US2023/082541, dated Apr. 12, 2024, 12 pages.

Tang et al. "Versatile carbon nanoplatforms for cancer treatment and diagnosis: strategies, applications and future perspectives.", Theranostics, 2022(Epub. Feb. 21, 2022), vol. 12, issue 5, pp. 2290-2321.

Rejinold et al, "Radio frequency responsive nano-biomaterials for cancer therapy", Journal of Controlled Release, 2015, vol. 204, pp. 85-97.

Pumprla et al., "Non-contact radiofrequency-induced reduction of subcutaneous abdominal fat correlates with initial cardiovascular autonomic balance and fat tissue hormones: safety analysis." F1000Res. Feb. 20, 2015; Version 1, 4:49. doi: 10.12688/f1000research.5708.1. PMID: 26069728; PMCID: PMC4431383, pp. 1-20, <https://www.ncbi.nlm.nih.gov/pmc/articles/PMC4431383/>.

International Preliminary Report on Patentability for PCT Application No. PCT/US2022/072424, dated Nov. 30, 2023, 7 pages.

International Preliminary Report on Patentability for PCT Application No. PCT/US2022/082122, dated Jul. 4, 2024, 8 pages.

International Preliminary Report on Patentability for PCT Application No. PCT/US2022/082130, dated Jul. 4, 2024, 9 pages.

International Preliminary Report on Patentability for PCT Application No. PCT/US2022/082134, dated Jul. 4, 2024, 8 pages.

International Preliminary Report on Patentability for PCT Application No. PCT/US2022/082138, dated Jul. 4, 2024, 8 pages.

International Preliminary Report on Patentability for PCT Application No. PCT/US2022/082142, dated Jul. 4, 2024, 8 pages.

International Preliminary Report on Patentability for PCT Application No. PCT/US2023/063417, dated Sep. 19, 2024, 8 pages.

International Preliminary Report on Patentability for PCT Application No. PCT/US2023/063419, dated Sep. 19, 2024, 7 pages.

International Preliminary Report on Patentability for PCT Application No. PCT/US2023/063420, dated Sep. 19, 2024, 8 pages.

International Preliminary Report on Patentability for PCT Application No. PCT/US2023/063422, dated Sep. 19, 2024, 8 pages.

International Preliminary Report on Patentability for PCT Application No. PCT/US2023/063423, dated Sep. 19, 2024, 8 pages.

International Preliminary Report on Patentability for PCT Application No. PCT/US2023/063424, dated Sep. 19, 2024, 8 pages.

International Preliminary Report on Patentability for PCT Application No. PCT/US2023/063427, dated Sep. 19, 2024, 7 pages.

International Preliminary Report on Patentability for PCT Application No. PCT/US2023/022885, dated Dec. 5, 2024, 8 pages.

International Preliminary Report on Patentability for PCT Application No. PCT/US2023/022892, dated Dec. 5, 2024, 8 pages.

International Preliminary Report on Patentability for PCT Application No. PCT/US2023/022899, dated Dec. 5, 2024, 8 pages.

Cao, M.J. et al., "Research progress on graphene production by methane cracking: approach and growth mechanism", Materials Today Sustainability, vol. 24, Dec. 2023.

Chen, Xi'an et al., "Sulfur-doped porous reduced graphene oxide hollow nanospheres framework as metal-free electrocatalysts for oxygen reduction reaction and supercapacitor electrode materials," Nanoscale, Sep. 2014, DOI: 10.1039/C4NR04783D, The Royal Society of Chemistry, pp. 1-7.

You, Chenghang et al., "Uniform nitrogen and sulfur co-doped carbonnanospheres as catalysts for the oxygenreduction reaction," Carbon, vol. 69, Apr. 2014, pp. 294-301.

(56) References Cited

OTHER PUBLICATIONS

Nepal, Arjun et al., "One-step synthesis of graphene via catalyst-free gas-phase hydrocarbon detonation," IOP Science, Nanotechnology, vol. 24, No. 24, published May 20, 2013, 3 pages <https://iopscience.iop.org/article/10.1088/0957-4484/24/24/245602>.

Galeon, Dom, "We May Finally Have a Way of Mass Producing Graphene," Futurism, dated Jan. 28, 2017, 7 pages, <https://futurism.com/we-may-finally-have-a-way-of-mass-producing-graphene>.

"Graphene Mass Produce," Google Search, <https://www.google.com/search?q=graphene*mass*produce&ie=UTF-8&OE=UTF-8&hl=en-us&client=safari>.

<https://firstgraphene.net/>.

<https://www.jmtour.com/media/Flash%20Graphene%20Video%20Rice%20University%202019.mp4>.

Ramirez, Giovanni et al., "Tribochemical Conversion of Methane to Graphene and Other Carbon Nanostructures: Implications for Friction and Wear," ACS Appl. Nano Mater., 2020, 3, 8, 8060-8067, Abstract only.

Wang, Feng et al., "High-purity few-layer graphene from plasma pyrolysis of methane as conductive additive for LiFePO4 lithium ion battery," Journal of Materials Research and Technology, vol. 9, Issue 5, Sep.-Oct. 2020, pp. 10004-10015.

Sorensen, Chris, "Physicists patent detonation technique to mass-produce graphene," Kansas State University, dated Jan. 25, 2017, 4 pages, <https://phys.org/news/2017-01-physicists-patent-detonation-technique-mass-produce.html>.

<https://scx2.b-cdn.net/gfx/news/2017/1-physicistspa.jpg>.

Zhakeyev, Adilet et al., "Additive Manufacturing: Unlocking the Evolution of Energy Materials," Advanced Science, vol. 4, Issue 10, published Jul. 25, 2017, 115 pages.

"Patented process converts petroleum feedstock to graphite, graphene and green hydrogen," First Graphene, ASX Announcement, dated Apr. 20, 2021, 2 pages.

Jiao, Yong et al., "High-performance triboelectric nanogenerators based onblade-coating lead halide perovskite film andelectrospinning PVDF/graphene nanofiber," Chemical Engineering Journal, vol. 483, Mar. 1, 2024, 149442, pp. 1-6.

"Focus on additives: Harnessing the power of graphene incoatings and paints", Polymers Paint Colour Journal, Feb. 20, 2024, pp. 1-11.

Kumar, Vijay et al., "Cavitation-corrosion analysis of HVOF-sprayed WC—Co—Cr-graphene nanoplatelets coatings with LST pre-treatment", International Journal of Refractory Metals and Hard Materials, vol. 120, Apr. 2024, 106610, pp. 1-6.

Li, Li et al., "Hydrophobic and anti-fouling novel anti-corrosion coatings of graphene quantum dots in situ doped withpolyphenylene sulfide", Surface and Coatings Technology, vol. 479, Mar. 15, 2024, 130527, pp. 1-5.

Lim, Yi Shen et al., "Nucleate boiling enhancement on hybrid graphene-nanoplatelets/carbon nanotubes coatings for light-emittingdiode cooling", Applied Thermal Engineering, vol. 244, May, 1, 2024, 122785, pp. 1-27.

Mourya, Punita et al., "Epoxy coating reinforced with graphene-PANI nanocomposites for enhancement of corrosion-resistanceperformance of mild steel in saline water", Colloids and Surfaces A: Physicochemical and Engineering Aspects, vol. 687, Apr. 20, 2024, 133500, pp. 1-6.

Pandey, Usha et al., "Comparative study of graphene oxide-multifunctionaloxide doping on corrosion resistance of electrodepositednickel coatings in saline environments", International Journal of Hydrogen Energy, vol. 60, Mar. 22, 2024, pp. 165-179.

Pang, Wuting et al., "Graphene oxides enhanced polyurethane based compositecoating with long term corrosion resistance and self-healing property", European Polymer Journal, vol. 207, Mar. 6, 2024, 112825, pp. 1-5.

Sama, Deepam. "What is Graphene Coating?Here's everything you must know", pp. 1-13. <https://www.carzspa.com/what-is-graphene-coating/>.

Selim, Mohamed S. et al., "Hierarchical biocide-free silicone/graphene-silicon carbidenanocomposite coatings for marine anti-fouling andsuperhydrophobicity of ship hulls", Chemical Engineering Science, vol. 291, Jun. 5, 2024, 119929, pp. 1-7.

Sy, Kim et al. "In-situ microscopy-assisted meniscus-guided coating forhighly sensitive reduced graphene oxide-basednanocomposite biosensor", Europe PMC Plus, Feb. 22, 2024, pp. 1-2.

GMG Provides Commercialisation Update on Energy SavingsCoating THERMAL-XR® (/blogpost/1501180/497649/GMG-Provides-Commercialisation-Update-on-Energy-Savings-Coating-THERMAL-XR), Feb. 2, 2024, pp. 1-6. <https://www.thegraphenecouncil.org/blogpost/1501180/497649/GMG-Provides-Commercialisation-Update-on-Energy-Savings-Coating-THERMAL-XR>.

Xie, Chan et al. "Long-lasting anti-corrosion of superhydrophobic coating bysynergistic modification of graphene oxide withpolydopamine and cerium oxide", Construction and Building Materials, vol. 418, Mar. 8, 2024, 135283, pp. 1-5.

Cao, M.J. et al. "Research progress on graphene production by methane cracking: approach and growth mechanism", Materials Today Sustainability, vol. 24, Aug. 30, 2023, pp. 1-20.

International Search Report and Written Opinion for PCT Application No. PCT/US2023/022885, dated Sep. 12, 2023, 11 pages.

International Search Report and Written Opinion for PCT Application No. PCT/US2023/022892, dated Sep. 7, 2023, 11 pages.

International Search Report and Written Opinion for PCT Application No. PCT/US2023/022899, dated Sep. 5, 2023, 11 pages.

Hasan, Maria et al., "Direct Chemical Vapor Deposition Synthesis of Large Area Single-Layer Brominated Graphene", The Royal Society of Chemistry, RSC Advances, May 1, 2019, pp. 13527-13532, vol. 9.

Xiaorong, Zou et al., "A Method for Selective Bromination of Graphene and its Use for Subsequent Functionalization with Aromatic Molecules", Materials Research Express, Feb. 28, 2017, pp. 1-8, vol. 4, IOP Science.

Lisichkin, G. V.et al., "Halogenation of Detonation-Synthesised Nanodiamond Surfaces", Mendeleev Communications, Jan. 27, 2009, pp. 309-310, vol. 19, No. 6. ScienceDirect.

Zhan, Y. et al., "Iodine Doped Graphene as Anode Material for Lithium Ion Battery", Carbon, Mar. 13, 2015, pp. 1-8, vol. 94.

Chen, Z. et al., "Oxygen-Doped Hierarchical Porous Carbon with Improved Selectivity of Hydrogen Peroxide in an Oxygen Reduction Reaction", Energy & Fuels, May 15, 2021, pp. 2665-2673, vol. 35.

Tavakol, H. et al. "Synthesis of Multi-Walled Phosphorus and Sulfur Co-Doped CNTs" Fullerenes, Nanotubes and Carbon Nanostructures, Oct. 22, 2018, pp. 715-721, vol. 26, No. 11.

Pappas, G. S. et al., "Heteroatom Doped-Carbon Nanospheres as Anodes in Lithium Ion Batteries", Materials, Jan. 9, 2016, pp. 1-13, vol. 9. MDPI, Basel Switzerland.

Wang, X. et al., "Heteroatom-Doped Graphene Materials: Syntheses, Properties and Applications", Chemical Society Reviews, Jun. 23, 2014, pp. 7067-7098, vol. 43.

Kaushal, S. et al., "Heteroatom-Doped Graphene as Sensing Materials: a Mini Review", RSC Advances, Aug. 4, 2020, pp. 28608-28629, vol. 10.

Lubwama, M. et al. "Characteristics and Tribological Performance of DLC and Si-DLC Films Deposited on Nitrile Rubber", Surface and Coatings Technology, May 12, 2012, pp. 4584-4593, vol. 206.

Qian, Z. et al., "Si-Doped Carbon Quantum Dots: a Facile and General Preparation Strategy, Bioimaging Application, and Multifunctional Sensor", ACS Applied Materials & Interfaces, Apr. 8, 2014, pp. 6797-6805, vol. 6, No. 9.

Tachikawa, H. et al., "Hydrogen Storage Mechanism in Sodium-Based Graphene Nanoflakes: a Density Functional Theory Study", Hydrogen, Jan. 19, 2022, pp. 43-52, vol. 3, No. 1. MDPI, Basel, Switzerland.

Márkus, B. G. et al., "Ultralong Spin Lifetime in Light Alkali Atom Doped Graphene", ACS Nano, Jun. 2, 2020, pp. 7492-7501, No. 14. ACS Publications.

International Search Report and Written Opinion for PCT Application No. PCT/US2023/063417, dated Jun. 9, 2023, 11 pages.

International Search Report and Written Opinion for PCT Application No. PCT/US2023/063419, dated Jun. 20, 2023, 10 pages.

International Search Report and Written Opinion for PCT Application No. PCT/US2023/063420, dated Jun. 8, 2023, 11 pages.

(56) References Cited

OTHER PUBLICATIONS

International Search Report and Written Opinion for PCT Application No. PCT/US2023/063422, dated Jun. 15, 2023, 11 pages.
International Search Report and Written Opinion for PCT Application No. PCT/US2023/063423, dated Jun. 15, 2023, 11 pages.
International Search Report and Written Opinion for PCT Application No. PCT/US2023/063424, dated Jun. 15, 2023, 11 pages.
International Search Report and Written Opinion for PCT Application No. PCT/US2023/063427, dated Jun. 20, 2023, 10 pages.
International Search Report and Written Opinion for PCT Application No. PCT/US2023/063428, dated Jun. 20, 2023, 9 pages.
International Search Report and Written Opinion for PCT Application No. PCT/US2023/063430, dated Jun. 15, 2023, 11 pages.
International Search Report and Written Opinion for PCT Application No. PCT/US2023/063431, dated Jun. 15, 2023, 11 pages.
Extended European Search Report for EP Application No. 22912691.7, dated Nov. 7, 2025, 8 pages.
Extended European Search Report for EP Application No. 22912695.8, dated Nov. 18, 2025, 9 pages.
Extended European Search Report for EP Application No. 22912697.4, dated Nov. 25, 2025, 10 pages.
Teng et al., "Fabrication and Characterization of Nanocarbon-Based Nanofluids by Using an Oxygen-Acetylene Flame Synthesis System," in Nanoscale Research Letters, 11:288 (2016), pp. 1-13 (Year: 2016).
Choma et al., "Development of Mesoporosity in Carbon Spheres Obtained by Stober Method", Microporous and Mesoporous Materials 185 (2014), 197-203. (Year: 2014).
Extended European Search Report for EP Application No. 22912699.0, dated Dec. 1, 2025, 10 pages.

Extended European Search Report for EP Application No. 22912702.2, dated Dec. 10, 2025, 7 pages.
Extended European Search Report for EP Application No. 23764054.5, dated Feb. 2, 2026, 14 pages.
Osswald, S., Yushin, G., Mochalin, V., Kucheyev, S.O., & Gogotsi, Y. (2006), "Control of sp2/sp3 carbon ratio and surface chemistry of nanodiamond powders by selective oxidation in Air," Journal of the American Chemical Society, 128(35), 11635-11642, <https://doi.org/10.1021/ja063303n> (Year: 2006).
Huang, C. et al., "Phosphorus, Nitrogen and Oxygen Co-Doped Polymer-Based Core-Shell Carbon Sphere for High-Performance Hybrid Supercapacitors," Electrochimica Acta, vol. 270, dated Apr. 20, 2018, pp. 339-351.
Ye, Zhengqing et al., "Nitrogen and oxygen-codoped carbon nanospheres for excellent specific capacitance and cyclic stability supercapacitor electrodes," Chemical Engineering Journal, vol. 330 (2017) pp. 1166-1173.
Deng, H. et al., "Radial Pores in Nitrogen/Oxygen Dual-Doped Carbon Nanospheres Anode Boost High-Power and Ultrastable Potassium-Ion Batteries," Advanced Functional Materials, vol. 31, Issue 51, (2021), pp. 1-11.
Zhang, Xu et al., "Impact of Chlorine Functionalization on High-Mobility Chemical Vapor Deposition Grown Graphene," ACS Nano, American Chemical Society, vol. 7, No. 8, dated 2013, pp. 7262-7270.
Spicer, P.T. et al., "Flame Synthesis of Composite Carbon Black-Fumed Silica Nanostructured Particles", Journal of Aerosol Science, Elmsford, NY, US, vol. 29, No. 5/06, Jun. 1, 1998, pp. 647-659.
Vital, Andri et al., "One-Step Flame Synthesis of Ultrafine SiO2-C Nanocomposite Particles with High Carbon Loading and Their Carbothermal Conversion," Industrial & Engineering Chemistry Research, vol. 46, No. 12, Jun. 1, 2007, pp. 4273-4281.

* cited by examiner

3000

Supply a Forming Mixture ⌐3010

Ignite the Forming Mixture to form
a Carbon-Based Nanomaterial Composition ⌐3020

Form the Carbon-Based Nanomaterial
Composition into a Layer of a Carbon-Based
Nanomaterial Based Cathode or
a Carbon-Based Nanomaterial Based Anode ⌐3030

BROMINE DOPED CARBON-BASED NANOMATERIAL AND METHODS OF FORMING THE SAME

CROSS-REFERENCE TO RELATED APPLICATION(S)

This application claims priority under 35 U.S.C. § 119(e) to U.S. Provisional Patent Application No. 63/268,880, entitled "BROMINE DOPED GRAPHENE AND METH-ODS OF FORMING THE SAME," filed Mar. 4, 2022, by Evan JOHNSON et al., which is assigned to the current assignee hereof and is incorporated herein by reference in its entirety.

FIELD OF THE DISCLOSURE

The present disclosure relates to a bromine doped carbon-based nanomaterial composition and methods of forming the same. More particularly, the present disclosure relates to a method, system, and apparatus for conversion of a gas mixture into a bromine doped carbon-based nanomaterial.

BACKGROUND

It is well understood that carbon, particularly complexed in CO and $CO_2$, but in any form that can convert into a greenhouse gas, is causing worldwide temperature increases. Various technologies are being developed to cap-ture carbon resulting from human activities, primarily indus-trial processes, fossil devised fuel and other combustion from vehicles (e.g., airplanes, cars & trucks, and commercial and residential uses).

Carbon-based nanomaterial is a hexagonal lattice made of a single layer of carbon atoms. Carbon-based nanomaterial has many desirable properties, such as high conductivity of heat and electricity along its plane, unique optical properties, and high mechanical strength. Due to these properties, carbon-based nanomaterial has a variety of applications including energy storage, electronics, semiconductors, com-posites, and membranes.

Existing combustion-based technologies for producing carbon-based nanomaterial use an oxygen-and-carbon-based gas mixture. However, these techniques do not fully and consistently break down carbon, thereby yielding an inconsistent product.

SUMMARY

According to a first aspect, a carbon-based nanomaterial composition may be formed from a gas mixture and a bromine powder. The gas mixture may include a carbon-based gas, an oxygen gas, and a hydrogen gas. The carbon-based nanomaterial composition may include bromine doped nanospheres.

According to another aspect, a method of forming a carbon-based nanomaterial composition may include sup-plying a forming mixture that may include a gas mixture and a bromine powder, and igniting the forming mixture to form the carbon-based nanomaterial composition. The gas mix-ture may include a carbon-based gas, an oxygen gas, and a hydrogen gas. The carbon-based nanomaterial composition may include bromine doped nanospheres.

According to still another aspect, a carbon-based nano-material composition may include bromine doped nano-spheres, a carbon content of at least about 60% and not greater than about 99% based on elemental analysis of the carbon-based nanomaterial composition, an oxygen content of at least about 0.0% and not greater than about 35% based on elemental analysis of the carbon-based nanomaterial composition, and a bromine content of at least about 1% and not greater than 50%.

According to another aspect, a carbon-based nanomate-rial-based cathode may include a layer of a carbon-based nanomaterial composition. The carbon-based nanomaterial composition may be formed from a gas mixture and a bromine powder. The gas mixture may include a carbon-based gas, an oxygen gas, and a hydrogen gas. The carbon-based nanomaterial composition may include bromine doped nanospheres.

According to another aspect, a method of forming a carbon-based nanomaterial-based cathode may include sup-plying a forming mixture that may include a gas mixture and a bromine powder, igniting the forming mixture to form the carbon-based nanomaterial composition, and forming the carbon-based nanomaterial composition into a layer of a carbon-based nanomaterial-based cathode. The gas mixture may include a carbon-based gas, an oxygen gas, and a hydrogen gas. The carbon-based nanomaterial composition may include bromine doped nanospheres.

According to still another aspect, a carbon-based nano-material-based cathode may include a layer of a carbon-based nanomaterial composition. The carbon-based nano-material composition may include bromine doped nanospheres, a carbon content of at least about 60% and not greater than about 99% based on elemental analysis of the carbon-based nanomaterial composition, an oxygen content of at least about 0.0% and not greater than about 35% based on elemental analysis of the carbon-based nanomaterial composition, and a bromine content of at least about 1% and not greater than 50%.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific imple-mentations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a carbon-based nanomaterial composition that may include bromine doped nanospheres. According to particular embodiments, the carbon-based nanomaterial composition may be defined as any carbon-based nanomaterial that may include a particular carbon content, and a particular oxygen content.

Figure 1:
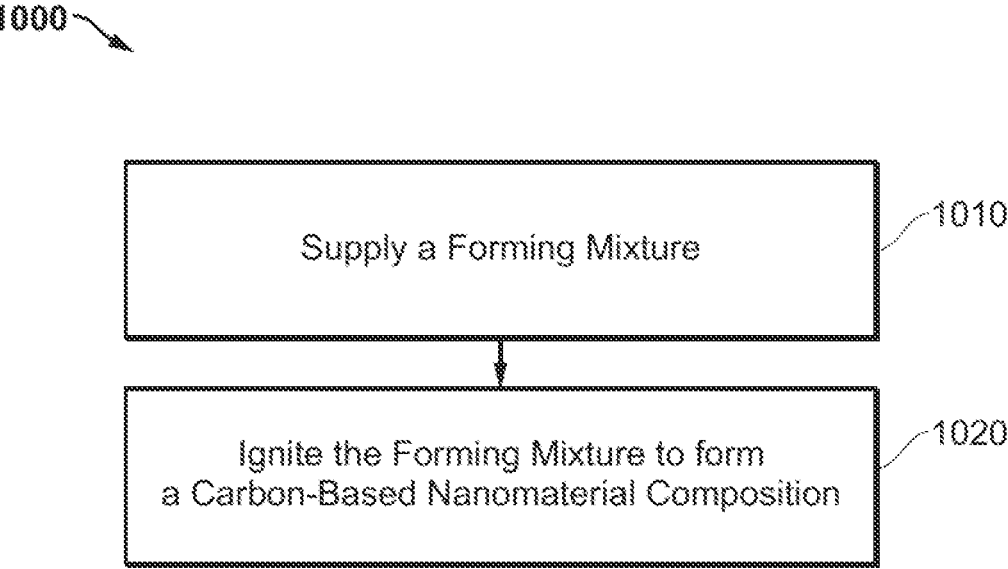
FIG. 1 includes a diagram showing a carbon-based nano-material composition forming method according to embodi-ments described herein.

Referring first to a method of forming a carbon-based nanomaterial composition, FIG. 1 includes a diagram showing a forming method 100 for forming a carbon-based nanomaterial composition according to embodiments described herein. According to particular embodiments, the forming method 1000 may include a first step 1010 of supplying a forming mixture, and a second step 1020 of igniting the forming mixture to form the carbon-based nanomaterial composition.

Referring to first step 1010, according to particular embodiments, the forming mixture may include a gas mixture and a bromine powder.

According to certain embodiments, the forming mixture may include a particular content of the bromine powder. For example, the forming mixture may include the bromine powder at a concentration of at least about 1 vol. % for a total volume of the forming mixture, such as, at least about 2 vol. % or at least about 4 vol. % or at least about 6 vol. % or at least about 8 vol. % or at least about 10 vol. % or at least about 12 vol. % or at least about 14 vol. % or at least about 16 vol. % or at least about 18 vol. % or at least about 20 vol. % or at least about 22 vol. % or at least about 24 vol. % or at least about 25 vol. %. According to still other embodiments, the forming mixture may include the bromine powder at a concentration of not greater than about 50 vol. %, such as, not greater than about 48 vol. % or not greater than about 46 vol. % or not greater than about 44 vol. % or not greater than about 42 vol. % or not greater than about 40 vol. % or not greater than about 38 vol. % or not greater than about 36 vol. % or not greater than about 34 vol. % or not greater than about 32 vol. % or not greater than about 30 vol. % or not greater than about 28 vol. % or not greater than about 26 vol. %. It will be appreciated that the bromine powder concentration in the forming mixture may be any value between, and including, any of the minimum and maximum values noted above. It will be further appreciated that the bromine powder concentration in the forming mixture may be within a range between, and including, any of the minimum and maximum values noted above.

According to certain embodiments, the forming mixture may include a particular content of the gas mixture. For example, the forming mixture may include the gas mixture at a concentration of at least about 50 vol. % for a total volume of the forming mixture, such as, at least about 52 vol. % or at least about 54 vol. % or at least about 56 vol. % or at least about 58 vol. % or at least about 60 vol. % or at least about 62 vol. % or at least about 64 vol. % or at least about 66 vol. % or at least about 68 vol. % or at least about 70 vol. % or at least about 72 vol. % or at least about 74 vol. % or at least about 75 vol. %. According to still other embodiments, the forming mixture may include the gas mixture at a concentration of not greater than about 98 vol. %, such as, not greater than about 97 vol. % or not greater than about 96 vol. % or not greater than about 94 vol. % or not greater than about 92 vol. % or not greater than about 90 vol. % or not greater than about 88 vol. % or not greater than about 86 vol. % or not greater than about 84 vol. % or not greater than about 82 vol. % or not greater than about 80 vol. % or not greater than about 78 vol. % or not greater than about 76 vol. %. It will be appreciated that the gas mixture concentration in the forming mixture may be any value between, and including, any of the minimum and maximum values noted above. It will be further appreciated that the gas mixture concentration in the forming mixture may be within a range between, and including, any of the minimum and maximum values noted above.

According to particular embodiments, the gas mixture may include a carbon-based gas, an oxygen gas, and a hydrogen gas.

According to certain embodiments, the gas mixture may include a particular molar ratio $CBG_{mol}/GM_{mol}$, where the $CBG_{mol}$ is equal to the moles of carbon-based gas in the gas mixture and $GM_{mol}$ is equal to the total moles of gas in the gas mixture. For example, the gas mixture may include a molar ratio $CBG_{mol}/GM_{mol}$ of at least about 0.05, such as, at least about 0.06 or at least about 0.07 or at least about 0.08 or at least about 0.09 or at least about 0.10 or at least about 0.11 or at least about 0.12 or at least about 0.13 or at least about 0.14 or at least about 0.15 or at least about 0.16 or at least about 0.17 or at least about 0.18 or at least about 0.19 or at least about 0.20 or at least about 0.21 or at least about 0.22 or at least about 0.23 or at least about 0.24 or at least about 0.25 or at least about 0.26 or at least about 0.27 or at least about 0.28 or at least about 0.29 or even at least about 0.29 or even at least about 0.30. According to still other embodiments, the gas mixture may include a molar ratio $CBG_{mol}/GM_{mol}$ of not greater than about 99, such as, not greater than about 0.95 or not greater than about 0.90 or not greater than about 0.85 or not greater than about 0.80 or not greater than about 0.75 or not greater than about 0.70 or not greater than about 0.69 or not greater than about 0.68 or not greater than about 0.67 or not greater than about 0.66 or not greater than about 0.65 or not greater than about 0.64 or not greater than about 0.63 or not greater than about 0.62 or not greater than about 0.61 or not greater than about 0.60 or not greater than about 0.59 or not greater than about 0.58 or not greater than about 0.57 or not greater than about 0.56 or not greater than about 0.55 or not greater than about 0.54 or not greater than about 0.53 or not greater than about 0.52 or not greater than about 0.51 or even not greater than about 0.50. It will be appreciated that the gas mixture may include a molar ratio $CBG_{mol}/GM_{mol}$ of any value between, and including, any of the minimum and maximum values noted above. It will be further appreciated that the gas mixture may include a molar ratio $CBG_{mol}/GM_{mol}$ within a range between, and including, any of the minimum and maximum values noted above.

According to particular embodiments, the gas mixture may include a particular content of carbon-based gas. For example, the gas mixture may include carbon-based gas at a concentration of at least about 0.8 mol, such as, at least about 0.9 mol or at least about 1.0 mol or at least about 1.01 mol or at least about 1.02 mol or at least about 1.03 mol or at least about 1.04 mol or at least about 1.05 mol or at least about 1.06 mol or at least about 1.07 mol or at least about 1.08 mol or at least about 1.09 mol or at least about 1.10 mol or at least about 1.11 mol or at least about 1.12 mol or at least about 1.13 mol or at least about 1.14 mol or at least about 1.15 mol or at least about 1.16 mol or at least about 1.17 mol or at least about 1.18 mol or at least about 1.19 mol or at least about 1.20 mol or at least about 1.25 mol or at least about 1.30 mol or at least about 1.35 mol or at least about 1.40 mol or at least about 1.45 mol or at least about 1.50 mol or at least about 1.75 mol or at least about 2.0 mol or at least about 2.5 mol or at least about 3.0 mol or at least about 3.5 mol or at least about 4.0 mol or at least about 4.5 mol or at least about 5.0 mol or at least about 5.5 mol or at least about 6.0 mol or even at least about 6.5 mol. According to still other embodiments, the gas mixture may include carbon-based gas at a concentration of not greater than about 18 mol, such as, not greater than about 17.5 mol or not greater than about 17.0 mol or not greater than about 16.5 mol or not greater than about 16.0 mol or not greater than about 15.5 mol or not greater than about 15.0 mol or not greater than about 14.5 mol or not greater than about 14.0 mol or not greater than about 13.5 mol or not greater than about 13.0 mol or not greater than about 12.5 mol or not greater than about 12.0 mol or not greater than about 11.5 mol or even not greater than about 11.0 mol or not greater than about 10.5 mol or even not greater than about 10.0 mol or not greater than about 8.5 mol or not greater than about 8.0 mol or not greater than about 7.5 mol or not greater than about 7.0 mol or not greater than about 6.5 mol or not greater than about 6.0 mol or not greater than about 5.5 mol or not greater than about 5.0 mol or not greater than about 4.5 mol or not greater than about 4.0 mol or not greater than about 3.9 mol or not greater than about 3.8 mol or not greater than about 3.7 mol or not greater than about 3.6 mol or not greater than about 3.5 mol or not greater than about 3.4 mol or not greater than about 3.3 mol or not greater than about 3.2 mol or not greater than about 3.1 mol or not greater than about 3.0 mol or not greater than about 2.9 mol or not greater than about 2.8 mol or even not greater than about 2.7 mol. It will be appreciated that the carbon-based gas concentration in the gas mixture may be any value between, and including, any of the minimum and maximum values noted above. It will be further appreciated that the carbon-based gas concentration in the gas mixture may be within a range between, and including, any of the minimum and maximum values noted above.

According to still other embodiments, the carbon-based gas may be acetylene gas, methane gas or any combination thereof.

According to certain embodiments, the gas mixture may include a particular molar ratio $AG_{mol}/GM_{mol}$, where the $AG_{mol}$ is equal to the moles of acetylene gas in the gas mixture and $GM_{mol}$ is equal to the total moles of gas in the gas mixture. For example, the gas mixture may include a molar ratio $AG_{mol}/GM_{mol}$ of at least about 0.05, such as, at least about 0.06 or at least about 0.07 or at least about 0.08 or at least about 0.09 or at least about 0.10 or at least about 0.11 or at least about 0.12 or at least about 0.13 or at least about 0.14 or at least about 0.15 or at least about 0.16 or at least about 0.17 or at least about 0.18 or at least about 0.19 or at least about 0.20 or at least about 0.21 or at least about 0.22 or at least about 0.23 or at least about 0.24 or at least about 0.25 or at least about 0.26 or at least about 0.27 or at least about 0.28 or at least about 0.29 or even at least about 0.30. According to still other embodiments, the gas mixture may include a molar ratio $AG_{mol}/GM_{mol}$ of not greater than about 0.99, such as, not greater than about 0.95 or not greater than about 0.90 or not greater than about 0.85 or not greater than about 0.80 or not greater than about 0.75 or not greater than about 0.70 or not greater than about 0.69 or not greater than about 0.68 or not greater than about 0.67 or not greater than about 0.66 or not greater than about 0.65 or not greater than about 0.64 or not greater than about 0.63 or not greater than about 0.62 or not greater than about 0.61 or not greater than about 0.60 or not greater than about 0.59 or not greater than about 0.58 or not greater than about 0.57 or not greater than about 0.56 or not greater than about 0.55 or not greater than about 0.54 or not greater than about 0.53 or not greater than about 0.52 or not greater than about 0.51 or even not greater than about 0.50. It will be appreciated that the gas mixture may include a molar ratio $AG_{mol}/GM_{mol}$ of any value between, and including, any of the minimum and maximum values noted above. It will be further appreciated that the gas mixture may include a molar ratio $AG_{mol}/GM_{mol}$ within a range between, and including, any of the minimum and maximum values noted above.

According to particular embodiments, the gas mixture may include a particular content of acetylene gas. For example, the gas mixture may include acetylene gas at a concentration of at least about 1.0 mol, such as, at least about 1.01 mol or at least about 1.02 mol or at least about 1.03 mol or at least about 1.04 mol or at least about 1.05 mol or at least about 1.06 mol or at least about 1.07 mol or at least about 1.08 mol or at least about 1.09 mol or at least about 1.10 mol or at least about 1.11 mol or at least about 1.12 mol or at least about 1.13 mol or at least about 1.14 mol or at least about 1.15 mol or at least about 1.16 mol or at least about 1.17 mol or at least about 1.18 mol or at least about 1.19 mol or even at least about 1.20 mol. According to still other embodiments, the gas mixture may include acetylene gas at a concentration of not greater than about 18 mol, such as, not greater than about 17.5 mol or not greater than about 17.0 mol or not greater than about 16.5 mol or not greater than about 16.0 mol or not greater than about 15.5 mol or not greater than about 15.0 mol or not greater than about 14.5 mol or not greater than about 14.0 mol or not greater than about 13.5 mol or not greater than about 13.0 mol or not greater than about 12.5 mol or not greater than about 12.0 mol or not greater than about 11.5 mol or even not greater than about 11.0 mol or not greater than about 10.5 mol or even not greater than about 10.0 mol or not greater than about 8.5 mol or not greater than about 8.0 mol or not greater than about 7.5 mol or not greater than about 7.0 mol or not greater than about 6.5 mol or not greater than about 6.0 mol or not greater than about 5.5 mol or not greater than about 5.0 mol or not greater than about 4.5 mol or not greater than about 4.0 mol or not greater than about 3.9 mol or not greater than about 3.8 mol or not greater than about 3.7 mol or not greater than about 3.6 mol or not greater than about 3.5 mol or not greater than about 3.4 mol or not greater than about 3.3 mol or not greater than about 3.2 mol or not greater than about 3.1 mol or not greater than about 3.0 mol or not greater than about 2.9 mol or not greater than about 2.8 mol or even not greater than about 2.7 mol. It will be appreciated that the acetylene gas concentration in the gas mixture may be any value between, and including, any of the minimum and maximum values noted above. It will be further appreciated that the acetylene gas concentration in the gas mixture may be within a range between, and including, any of the minimum and maximum values noted above.

According to certain embodiments, the gas mixture may include a particular molar ratio $OG_{mol}/GM_{mol}$, where the $OG_{mol}$ is equal to the moles of oxygen gas in the gas mixture and $GM_{mol}$ is equal to the total moles of gas in the gas mixture. For example, the gas mixture may include a molar ratio $OG_{mol}/GM_{mol}$ of at least about 0.01, such as, at least about 0.02 or at least about 0.03 or at least about 0.04 or at least about 0.05 or at least about 0.06 or at least about 0.07 or at least about 0.08 or at least about 0.09 or at least about 0.10 or at least about 0.11 or at least about 0.12 or at least about 0.13 or at least about 0.14 or at least about 0.15 or at least about 0.16 or at least about 0.17 or at least about 0.18 or at least about 0.19 or even at least about 0.20. According to still other embodiments, the gas mixture may include a molar ratio $OG_{mol}/GM_{mol}$ of not greater than about 85, such as, not greater than about 0.80 or not greater than about 0.75 or not greater than about 0.70 or not greater than about 0.65 or not greater than about 0.60 or not greater than about 0.55 or not greater than about 0.50 or not greater than about 0.45 or not greater than about 0.40 or not greater than about 0.39 or not greater than about 0.38 or not greater than about 0.37 or not greater than about 0.36 or not greater than about 0.35 or not greater than about 0.34 or not greater than about 0.33 or not greater than about 0.32 or not greater than about 0.31 or not greater than about 0.30 or not greater than about 0.29 or not greater than about 0.28 or not greater than about 0.27 or not greater than about 0.26 or even not greater than about 0.25. It will be appreciated that the gas mixture may include a molar ratio $OG_{mol}/GM_{mol}$ of any value between, and including, any of the minimum and maximum values noted above. It will be further appreciated that the gas mixture may include a molar ratio $OG_{mol}/GM_{mol}$ within a range between, and including, any of the minimum and maximum values noted above.

According to other embodiments, the gas mixture may include a particular content of oxygen gas. For example, the gas mixture may include oxygen gas at a concentration of at least about 0.1 mol, such as, at least about 0.11 mol or at least about 0.12 mol or at least about 0.13 mol or at least about 0.14 mol or at least about 0.15 mol or at least about 0.16 mol or at least about 0.17 mol or at least about 0.18 mol or at least about 0.19 mol or at least about 0.20 mol or at least about 0.21 mol or at least about 0.22 mol or at least about 0.23 mol or at least about 0.24 mol or at least about 0.25 mol or at least about 0.26 mol or at least about 0.27 mol or at least about 0.28 mol or at least about 0.29 mol or even at least about 0.30 mol. According to still other embodiments, the gas mixture may include oxygen gas at a concentration of not greater than about 13 mol, such as, not greater than about 12.5 mol or not greater than about 12.0 mol or not greater than about 11.5 mol or not greater than about 11.0 mol or not greater than about 10.5 mol or not greater than about 10.0 mol or not greater than about 9.5 mol or not greater than about 9.0 mol or not greater than about 8.5 mol or not greater than about 8.0 mol or not greater than about 7.5 mol or not greater than about 7.0 mol or not greater than about 6.5 mol or not greater than about 6.0 mol or not greater than about 5.5 mol or not greater than about 5.0 mol or not greater than about 4.5 mol or not greater than about 4.0 mol or not greater than about 3.5 mol or not greater than about 3.0 mol or not greater than about 2.5 mol or not greater than about 2.0 mol or not greater than about 1.5 mol or not greater than about 1.0 mol or not greater than about 0.98 mol or not greater than about 0.96 mol or not greater than about 0.94 mol or not greater than about 0.92 mol or not greater than about 0.90 mol or not greater than about 0.88 mol or not greater than about 0.86 mol or not greater than about 0.84 mol or not greater than about 0.82 mol or not greater than about 0.80 mol or not greater than about 0.78 mol or not greater than about 0.76 mol or even not greater than about 0.74 mol. It will be appreciated that the oxygen gas concentration in the gas mixture may be any value between, and including, any of the minimum and maximum values noted above. It will be further appreciated that the oxygen gas concentration in the gas mixture may be within a range between, and including, any of the minimum and maximum values noted above.

According to certain embodiments, the gas mixture may include a particular molar ratio $HG_{mol}/GM_{mol}$, where the $HG_{mol}$ is equal to the moles of hydrogen gas in the gas mixture and $GM_{mol}$ is equal to the total moles of gas in the gas mixture. For example, the gas mixture may include a molar ratio $HG_{mol}/GM_{mol}$ of at least about 0.0, such as, at least about 0.01 or at least about 0.02 or at least about 0.03 or at least about 0.04 or at least about 0.05 or at least about 0.06 or at least about 0.07 or at least about 0.08 or at least about 0.09 or at least about 0.10 or at least about 0.11 or at least about 0.12 or at least about 0.13 or at least about 0.14 or at least about 0.15 or at least about 0.16 or at least about 0.17 or at least about 0.18 or at least about 0.19 or even at least about 0.20. According to still other embodiments, the gas mixture may include a molar ratio $HG_{mol}/GM_{mol}$ of not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or not greater than about 0.60 or not greater than about 0.55 or not greater than about 0.50 or not greater than about 0.45 or not greater than about 0.40 or not greater than about 0.39 or not greater than about 0.38 or not greater than about 0.37 or not greater than about 0.36 or not greater than about 0.35 or not greater than about 0.34 or not greater than about 0.33 or not greater than about 0.32 or not greater than about 0.31 or not greater than about 0.30 or not greater than about 0.29 or not greater than about 0.28 or not greater than about 0.27 or not greater than about 0.26 or even not greater than about 0.25. It will be appreciated that the gas mixture may include a molar ratio $HG_{mol}/GM_{mol}$ of any value between, and including, any of the minimum and maximum values noted above. It will be further appreciated that the gas mixture may include a molar ratio $HG_{mol}/GM_{mol}$ within a range between, and including, any of the minimum and maximum values noted above.

According to still other embodiments, the gas mixture may include a particular content of hydrogen gas. For example, the gas mixture may include hydrogen gas at a concentration of at least about 0.0 mol, such as, at least about 0.25 mol or at least about 0.50 mol or at least about 0.75 mol or at least about 1.0 mol or at least about 1.25 mol or at least about 1.50 mol or at least about 1.75 mol or at least about 2.0 mol or at least about 2.5 mol or at least about 3.0 mol or at least about 3.5 mol or at least about 4.0 mol or at least about 4.5 mol or at least about 5.0 mol or at least about 5.5 mol or at least about 6.0 mol or at least about 7.0 mol or at least about 8.0 mol or at least about 8.5 mol or at least about 9.0 mol or at least about 9.5 mol or even at least about 10.0 mol. According to still other embodiments, the gas mixture may include hydrogen gas at a concentration of not greater than about 20.0 mol, such as, not greater than about 19.5 mol or not greater than about 19.0 mol or not greater than about 18.5 mol or not greater than about 18.0 mol or not greater than about 17.5 mol or not greater than about 17.0 mol or not greater than about 16.5 mol or not greater than about 16.0 mol or not greater than about 15.5 mol or not greater than about 15.0 mol or not greater than about 14.5 mol or not greater than about 14.0 mol or not greater than about 13.5 mol or not greater than about 13.0 mol or not greater than about 12.5 mol or not greater than about 12.0 mol or not greater than about 11.5 mol or even not greater than about 11.0 mol or not greater than about 10.5 mol or even not greater than about 10.0 mol. It will be appreciated that the hydrogen gas concentration in the gas mixture may be any value between, and including, any of the minimum and maximum values noted above. It will be further appreciated that the hydrogen gas concentration in the gas mixture may be within a range between, and including, any of the minimum and maximum values noted above.

According to certain embodiments, the gas mixture may include a particular molar ratio $MG_{mol}/GM_{mol}$, where the $MG_{mol}$ is equal to the moles of methane gas in the gas mixture and $GM_{mol}$ is equal to the total moles of gas in the gas mixture. For example, the gas mixture may include a molar ratio $MG_{mol}/GM_{mol}$ of at least about 0.0, such as, at least about 0.05 or at least about 0.06 or at least about 0.07 or at least about 0.08 or at least about 0.09 or at least about 0.10 or at least about 0.11 or at least about 0.12 or at least about 0.13 or at least about 0.14 or at least about 0.15 or at least about 0.16 or at least about 0.17 or at least about 0.18 or at least about 0.19 or at least about 0.20 or at least about 0.21 or at least about 0.22 or at least about 0.23 or at least about 0.24 or at least about 0.25 or at least about 0.26 or at least about 0.27 or at least about 0.28 or at least about 0.29 or even at least about 0.30. According to still other embodiments, the gas mixture may include a molar ratio $MG_{mol}/GM_{mol}$ of not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or not greater than about 0.60 or not greater than about 0.55 or not greater than about 0.50 or not greater than about 0.45 or not greater than about 0.40 or not greater than about 0.39 or not greater than about 0.38 or not greater than about 0.37 or not greater than about 0.36 or not greater than about 0.35 or not greater than about 0.34 or not greater than about 0.33 or not greater than about 0.32 or not greater than about 0.31 or not greater than about 0.30 or not greater than about 0.29 or not greater than about 0.28 or not greater than about 0.27 or not greater than about 0.26 or even not greater than about 0.25. It will be appreciated that the gas mixture may include a molar ratio $MG_{mol}/GM_{mol}$ of any value between, and including, any of the minimum and maximum values noted above. It will be further appreciated that the gas mixture may include a molar ratio $MG_{mol}/GM_{mol}$ within a range between, and including, any of the minimum and maximum values noted above.

According to particular embodiments, the gas mixture may include a particular content of methane gas. For example, the gas mixture may include methane gas at a concentration of at least about 1.0 mol, such as, at least about 1.01 mol or at least about 1.02 mol or at least about 1.03 mol or at least about 1.04 mol or at least about 1.05 mol or at least about 1.06 mol or at least about 1.07 mol or at least about 1.08 mol or at least about 1.09 mol or at least about 1.10 mol or at least about 1.11 mol or at least about 1.12 mol or at least about 1.13 mol or at least about 1.14 mol or at least about 1.15 mol or at least about 1.16 mol or at least about 1.17 mol or at least about 1.18 mol or at least about 1.19 mol or even at least about 1.20 mol. According to still other embodiments, the gas mixture may include methane gas at a concentration of not greater than about 20.0 mol, such as, not greater than about 19.5 mol or not greater than about 19.0 mol or not greater than about 18.5 mol or not greater than about 18.0 mol or not greater than about 17.5 mol or not greater than about 17.0 mol or not greater than about 16.5 mol or not greater than about 16.0 mol or not greater than about 15.5 mol or not greater than about 15.0 mol or not greater than about 14.5 mol or not greater than about 14.0 mol or not greater than about 13.5 mol or not greater than about 13.0 mol or not greater than about 12.5 mol or not greater than about 12.0 mol or not greater than about 11.5 mol or even not greater than about 11.0 mol or not greater than about 10.5 mol or not greater than about 10.0 mol or not greater than about 9.5 mol or not greater than about 9.0 mol or not greater than about 8.5 mol or not greater than about 8.0 mol or not greater than about 7.5 mol or not greater than about 7.0 mol or not greater than about 6.5 mol or not greater than about 6.0 mol or not greater than about 5.5 mol or not greater than about 5.0 mol or not greater than about 4.5 mol or not greater than about 4.0 mol or not greater than about 3.5 mol or not greater than about 3.0 mol or not greater than about 2.5 mol or not greater than about 2.40 mol or not greater than about 2.39 mol or not greater than about 2.38 mol or not greater than about 2.37 mol or not greater than about 2.36 mol or not greater than about 2.35 mol or not greater than about 2.34 mol or not greater than about 2.33 mol or not greater than about 2.30 mol or not greater than about 2.29 mol or not greater than about 2.28 mol or not greater than about 2.27 mol or not greater than about 2.26 mol or even not greater than about 2.25 mol. It will be appreciated that the methane gas concentration in the gas mixture may be any value between, and including, any of the minimum and maximum values noted above. It will be further appreciated that the methane gas concentration in the gas mixture may be within a range between, and including, any of the minimum and maximum values noted above.

According to still other embodiments, the carbon-based nanomaterial composition may be formed at a particular combustion temperature. For example, the carbon-based nanomaterial composition may be formed at a combustion temperature of at least about 1500° C., such as, at least about 1600° C. or at least about 1700° C. or at least about 1800° C. or at least about 1900° C. or at least about 2000° C. or at least about 2100° C. or even at least about 2200° C. According to still other embodiments, the carbon-based nanomaterial composition may be formed at a combustion temperature of not greater than about 3000° C., such as, not greater than about 2900° C. or not greater than about 2800° C. or not greater than about 2700° C. or not greater than about 2600° C. or not greater than about 2500° C. or not greater than about 2400° C. or even not greater than about 2300° C. It will be appreciated that the carbon-based nanomaterial composition may be formed at a combustion temperature of any value between, and including, any of the minimum and maximum values noted above. It will be further appreciated that the carbon-based nanomaterial composition may be formed at a combustion temperature of a value within a range between, and including, any of the minimum and maximum values noted above.

According to still other embodiments, the carbon-based nanomaterial composition may be formed at a particular combustion pressure. For example, the carbon-based nanomaterial composition may be formed at a combustion pressure of at least about 200 PSI, such as, at least about 300 PSI or at least about 400 PSI or at least about 500 PSI or at least about 600 PSI or at least about 700 PSI or at least about 800 PSI or even at least about 900 PSI. According to still other embodiments, the carbon-based nanomaterial composition may be formed at a combustion pressure of not greater than about 3000 PSI, such as, not greater than about 2900 PSI or not greater than about 2800 PSI or not greater than about 2700 PSI or not greater than about 2600 PSI or not greater than about 2500 PSI or not greater than about 2400 PSI or even not greater than about 2300 PSI. It will be appreciated that the carbon-based nanomaterial composition may be formed at a combustion pressure of any value between, and including, any of the minimum and maximum values noted above. It will be further appreciated that the carbon-based nanomaterial composition may be formed at a combustion pressure of a value within a range between, and including, any of the minimum and maximum values noted above.

According to still other embodiments, the forming mixture may further include a secondary dopant precursor component.

According to certain embodiments, the secondary dopant precursor component may include a particular material. For example, the secondary dopant precursor component may include boron. According to still other embodiments, the secondary dopant precursor component may include chlorine. According to other embodiments, the secondary dopant precursor component may include iodine. According to yet other embodiments, the secondary dopant precursor component may include nitrogen. According to still other embodiments, the secondary dopant precursor component may include oxygen. According to still other embodiments, the secondary dopant precursor component may include phosphorous. According to still other embodiments, the secondary dopant precursor component may include silicon. According to still other embodiments, the secondary dopant precursor component may include silicon dioxide. According to still other embodiments, the secondary dopant precursor component may include sodium. According to still other embodiments, the secondary dopant precursor component may include any combination bromine, chlorine, iodine, nitrogen, oxygen, phosphorous, silicon, silicon dioxide, or sodium.

According to certain embodiments, the secondary dopant precursor component may consist of a particular material. For example, the secondary dopant precursor component may consist of boron. According to still other embodiments, the secondary dopant precursor component may consist of chlorine. According to other embodiments, the secondary dopant precursor component may consist of iodine. According to yet other embodiments, the secondary dopant precursor component may consist of nitrogen. According to still other embodiments, the secondary dopant precursor component may consist of oxygen. According to still other embodiments, the secondary dopant precursor component may consist of phosphorous. According to still other embodiments, the secondary dopant precursor component may consist of silicon. According to still other embodiments, the secondary dopant precursor component may consist of silicon dioxide. According to still other embodiments, the secondary dopant precursor component may consist of sodium. According to still other embodiments, the secondary dopant precursor component may consist of any combination bromine, chlorine, iodine, nitrogen, oxygen, phosphorous, silicon, silicon dioxide, or sodium.

Referring now to embodiments of the carbon-based nanomaterial composition formed according to forming method 100, the carbon-based nanomaterial composition may include bromine doped nanospheres, a carbon content based on elemental analysis, and an oxygen content based on elemental analysis.

According to certain embodiments, the bromine doped nanospheres may have a particular diameter. For example, the bromine doped nanospheres may have a diameter of at least about 5 nm, such as, at least about 10 nm or at least about 20 nm or at least about 30 nm or at least about 40 nm or at least about 50 nm or at least about 60 nm or at least about 70 nm or at least about 80 nm or at least about 90 nm or at least about 100 nm or at least about 150 nm or at least about 200 nm or even at least about 250 nm. According to still other embodiments, the bromine doped nanospheres may have a diameter of not greater than about 500 nm, such as, not greater than about 490 nm or not greater than about 480 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the diameter of the bromine doped nanospheres may be any value between, and including, any of the minimum and maximum values noted above. It will be further appreciated that the diameter of the bromine doped nanospheres may be within a range between, and including, any of the minimum and maximum values noted above.

According to particular embodiments, the carbon-based nanomaterial composition may have a particular carbon content based on elemental analysis conducted using x-ray photoelectron spectroscopy (XPS). For example, the carbon-based nanomaterial composition may include a carbon content of at least about 60%, such as, at least about 62% or at least about 64% or at least about 66% or at least about 68% or at least about 70% or at least about 72% or at least about 74% or at least about 76% or at least about 78% or at least about 80% or at least about 83% or at least about 85% or at least about 88% or at least about 90% or at least about 91% or at least about 92% or at least about 93% or at least about 94.0% or even at least about 95.0%. According to still other embodiments, the carbon-based nanomaterial composition may include a carbon content of not greater than about 99%, such as, not greater than about 97% or not greater than about 95% or not greater than about 93% or even not greater than about 91%. It will be appreciated that the carbon content in the carbon-based nanomaterial composition may be any value between, and including, any of the minimum and maximum values noted above. It will be further appreciated that the carbon content in the carbon-based nanomaterial composition may be within a range between, and including, any of the minimum and maximum values noted above.

According to still other embodiments, the carbon-based nanomaterial composition may include particular oxygen content based on elemental analysis conducted using x-ray photoelectron spectroscopy (XPS). For example, the carbon-based nanomaterial composition may include an oxygen content of at least about 0.0%, such as, at least about 0.5% or at least about 1.0% or at least about 1.5% or at least about 2.0% or at least about 2.5% or at least about 3.0% or at least about 3.5% or at least about 4.0% or at least about 4.5% or at least about 5.0%, or at least about 10% or at least about 15% or even at least about 20%. According to still other embodiments, the carbon-based nanomaterial composition may include an oxygen content of not greater than about 35%, such as, not greater than about 30% or greater than about 25% or not greater than about 23% or not greater than about 20% or not greater than about 18% or not greater than about 15% or not greater than about 13% or not greater than about 10% or not greater than about 8% or even not greater than about 6.0%. It will be appreciated that the oxygen content in the carbon-based nanomaterial composition may be any value between, and including, any of the minimum and maximum values noted above. It will be further appreciated that the oxygen content in the carbon-based nanomaterial composition may be within a range between, and including, any of the minimum and maximum values noted above.

According to certain embodiments, the bromine doped nanospheres may include a particular bromine content based on elemental analysis conducted using x-ray photoelectron spectroscopy (XPS). For example, the bromine doped nanospheres may include bromine at a concentration of at least about 2%, such as, at least about 4% or at least about 6% or at least about 8% or at least about 10% or at least about 12% or at least about 14% or at least about 16% or at least about 18% or at least about 20% or at least about 22% or at least about 24% or at least about 25%. According to still other embodiments, the bromine doped nanospheres may include bromine at a concentration of not greater than about 50%, such as, not greater than about 48 vol. % or not greater than about 46 vol. % or not greater than about 44 vol. % or not greater than about 42 vol. % or not greater than about 40 vol. % or not greater than about 38 vol. % or not greater than about 36 vol. % or not greater than about 34 vol. % or not greater than about 32 vol. % or not greater than about 30 vol. % or not greater than about 28 vol. % or not greater than about 26 vol. %. It will be appreciated that the bromine concentration in the bromine doped nanospheres may be any value between, and including, any of the minimum and maximum values noted above. It will be further appreciated that the bromine concentration in the bromine doped nanospheres may be within a range between, and including, any of the minimum and maximum values noted above.

According to certain embodiments, the carbon-based nanomaterial composition may include a particular bromine content based on elemental analysis conducted using x-ray photoelectron spectroscopy (XPS). For example, the carbon-based nanomaterial composition may include bromine at a concentration of at least about 2%, such as, at least about 4% or at least about 6% or at least about 8% or at least about 10% or at least about 12% or at least about 14% or at least about 16% or at least about 18% or at least about 20% or at least about 22% or at least about 24% or at least about 25%. According to still other embodiments, the carbon-based nanomaterial composition may include bromine at a concentration of not greater than about 50%, such as, not greater than about 48 vol. % or not greater than about 46 vol. % or not greater than about 44 vol. % or not greater than about 42 vol. % or not greater than about 40 vol. % or not greater than about 38 vol. % or not greater than about 36 vol. % or not greater than about 34 vol. % or not greater than about 32 vol. % or not greater than about 30 vol. % or not greater than about 28 vol. % or not greater than about 26 vol. %. It will be appreciated that the bromine concentration in the carbon-based nanomaterial composition may be any value between, and including, any of the minimum and maximum values noted above. It will be further appreciated that the bromine concentration in the carbon-based nanomaterial composition may be within a range between, and including, any of the minimum and maximum values noted above.

According to still other embodiments, the carbon-based nanomaterial composition may have a particular D/G ratio as measured by performing Raman spectroscopy on a sample of powder and detangling the spectrum produced. For example, the carbon-based nanomaterial composition may have a D/G ratio of at least about 0.1, such as, at least about 0.15 or at least about 0.20 or at least about 0.25 or at least about 0.30 or at least about 0.35 or at least about 0.40 or at least about 0.45. According to still other embodiments, the carbon-based nanomaterial composition may have a D/G ratio of not greater than about 2.0, such as, not greater than about 1.95 or not greater than about 1.90 or not greater than about 1.85 or not greater than about 1.80 or not greater than about 1.75 or not greater than about 1.70 or not greater than about 1.65 or not greater than about 1.60 or not greater than about 1.55 or not greater than about 1.50 or not greater than about 1.45 or not greater than about 1.40 or not greater than about 1.35 or not greater than about 1.30 or not greater than about 1.25 or not greater than about 1.20 or not greater than about 1.15 or not greater than about 1.10 or not greater than about 1.05 or not greater than about 1.00 or not greater than about 0.95 or not greater than about 0.9 or not greater than about 0.85 or not greater than about 0.8 or not greater than about 0.75 or not greater than about 0.7 or not greater than about 0.65 or even not greater than about 0.6. It will be appreciated that the D/G ratio of the carbon-based nanomaterial composition may be any value between, and including, any of the minimum and maximum values noted above. It will be further appreciated that the D/G ratio of the carbon-based nanomaterial composition may be within a range between, and including, any of the minimum and maximum values noted above.

According to still other embodiments, the carbon-based nanomaterial composition may have a particular aspect ratio as measured by dividing the lateral size by the thickness of a given sample. For example, the carbon-based nanomaterial composition may have an aspect ratio of at least about 1.0, such as, at least about 5 or at least about 10 or at least about 20. According to still other embodiments, the carbon-based nanomaterial composition may have an aspect ratio of not greater than about 100, such as, not greater than about 90 or not greater than about 80 or not greater than about 70 or not greater than about 60. It will be appreciated that the aspect ratio of the carbon-based nanomaterial composition may be any value between, and including, any of the minimum and maximum values noted above. It will be further appreciated that the aspect ratio of the carbon-based nanomaterial composition may be within a range between, and including, any of the minimum and maximum values noted above.

According to yet other embodiments, the carbon-based nanomaterial composition may have a particular carbon hybridization ratio $P_{sp3}/P_{sp2}$, where $P_{sp3}$ is the percent of carbon within the carbon-based nanomaterial composition having a sp3 hybridization and $P_{sp2}$ is the percent of carbon within the carbon-based nanomaterial composition having a sp2 hybridization. For example, the carbon-based nanomaterial composition may have a carbon hybridization ratio $P_{sp3}/P_{sp2}$ of at least about 0.0, such as, at least about 0.1 or at least about 0.2 or at least about 0.3 or at least about 0.4 or at least about 0.5 or at least about 0.6 or at least about 0.7 or at least about 0.8 or at least about 0.9 or at least about 1.0 or at least about 1.1 or at least about 1.2 or at least about 1.3 or at least about 1.4 or even at least about 1.5. According to still other embodiments, the carbon-based nanomaterial composition may have a carbon hybridization ratio $P_{sp3}/P_{sp2}$ of not greater than about 5.00, such as, not greater than about 4.75 or not greater than about 4.5 or not greater than about 4.25 or not greater than about 4.0 or not greater than about 3.75 or not greater than about 3.50 or not greater than about 3.25 or not greater than about 3.0 or not greater than about 2.9 or not greater than about 2.8 or not greater than about 2.7 or not greater than about 2.6 or not greater than about 2.5 or not greater than about 2.4 or not greater than about 2.3 or not greater than about 2.2 or not greater than about 2.1 or even not greater than about 2.0. It will be appreciated that the carbon hybridization ratio $P_{sp3}/P_{sp2}$ of the carbon-based nanomaterial composition may be any value between, and including, any of the minimum and maximum values noted above. It will be further appreciated that the carbon hybridization ratio $P_{sp3}/P_{sp2}$ of the carbon-based nanomaterial composition may be within a range between, and including, any of the minimum and maximum values noted above.

According to still other embodiments, the carbon-based nanomaterial composition may further include a secondary dopant.

According to certain embodiments, the secondary dopant may include a particular material. For example, the secondary dopant may include boron. According to still other embodiments, the secondary dopant may include chlorine. According to other embodiments, the secondary dopant may include iodine. According to yet other embodiments, the secondary dopant may include nitrogen. According to still other embodiments, the secondary dopant may include oxygen. According to still other embodiments, the secondary dopant may include phosphorous. According to still other embodiments, the secondary dopant may include silicon. According to still other embodiments, the secondary dopant may include silicon dioxide. According to still other embodiments, the secondary dopant may include sodium. According to still other embodiments, the secondary dopant may include any combination bromine, chlorine, iodine, nitrogen, oxygen, phosphorous, silicon, silicon dioxide, or sodium.

According to certain embodiments, the secondary dopant may consist of a particular material. For example, the secondary dopant may consist of boron. According to still other embodiments, the secondary dopant may consist of chlorine. According to other embodiments, the secondary dopant may consist of iodine. According to yet other embodiments, the secondary dopant may consist of nitrogen. According to still other embodiments, the secondary dopant may consist of oxygen. According to still other embodiments, the secondary dopant may consist of phosphorous. According to still other embodiments, the secondary dopant may consist of silicon. According to still other embodiments, the secondary dopant may consist of silicon dioxide. According to still other embodiments, the secondary dopant may consist of sodium. According to still other embodiments, the secondary dopant may consist of any combination bromine, chlorine, iodine, nitrogen, oxygen, phosphorous, silicon, silicon dioxide, or sodium.

According to certain embodiments, the carbon-based nanomaterial may have particular carbon structures. For example, according to certain embodiments, the carbon-based nanomaterial may include carbon-based nanosheets. According to certain embodiments, the carbon-based nanomaterial may consist of carbon-based nanosheets. For purposes of embodiments described herein, a nanosheet may be defined as a two-dimensional allotropic form of carbon. According to still other embodiments, a nanosheet may have Sp2-hybridized carbon atoms, connected by sigma and pi bonds in a hexagonal lattice of polyaromatic rings.

According to certain embodiments, the carbon-based nanomaterial may include carbon-based nanoflakes. According to certain embodiments, the carbon-based nanomaterial may consist of carbon-based nanoflakes. For purposes of embodiments described herein, a nanoflake may be defined as a Lamellae of carbon-based nanomaterial, such as, a two-dimensional carbon sheet. According to still other embodiments, the nanoflakes may have two-dimensional carbon sheet size of between about 50 nm and 100 nm.

According to certain embodiments, the carbon-based nanomaterial may include carbon-based nanospheres. According to certain embodiments, the carbon-based nanomaterial may consist of carbon-based nanospheres. For purposes of embodiments described herein, a nanosphere may be defined as a Sp2-hybridized form of carbon with atomic carbon clusters formed into a spherical structure via covalent bonds. According to certain embodiments, the nanospheres a radii ranging from about 50 nm to about 250 nm.

According to certain embodiments, the carbon-based nanomaterial may include carbon-based nano-onions. According to certain embodiments, the carbon-based nanomaterial may consist of carbon-based nano-onions. For purposes of embodiments described herein, a nano-onion may be defined as a nanostructures that includes multiple concentric shells of hexagonal-latticed sheets, strained to form spherical structures. According to still other embodiments, the nano-onions may include layers folded over on themselves such that they resemble an onion shell, sometimes encompassing a small volume of amorphous carbon.

According to still other embodiments, the carbon-based nanomaterial may include carbon black. According to certain embodiments, the carbon-based nanomaterial may consist of carbon black. For purposes of embodiments described herein, carbon black may be defined as material that is spherical with radii below 1000 nm. According to still other embodiments, the carbon black may be amorphous and may be a black fine powder.

According to still other embodiments, the carbon-based nanomaterial may include turbostratic carbon. According to certain embodiments, the carbon-based nanomaterial may consist of turbostratic carbon. For purposes of embodiments described herein, turbostratic carbon may be defined as a material having a mixture of sp2- and sp3-hybridized carbon, where the sp2-hybridized planes are surrounded and connected by a sp3-hybridized amorphous matrix. The turbostratic carbon may include curved sheets of carbon-based nanomaterial-like carbon-polyaromatic structures, forming grape-like fractal aggregates of primary particles.

According to still other embodiments, the carbon-based nanomaterial may include any combination of carbon-based nanosheets, carbon-based nanoflakes, carbon-based nanospheres, carbon-based nano-onions, carbon black, or turbostratic carbon. According to still other embodiments, the carbon-based nanomaterial may consist of any combination of carbon-based nanosheets, carbon-based nanoflakes, carbon-based nanospheres, carbon-based nano-onions, carbon black, or turbostratic carbon.

Figure 2:
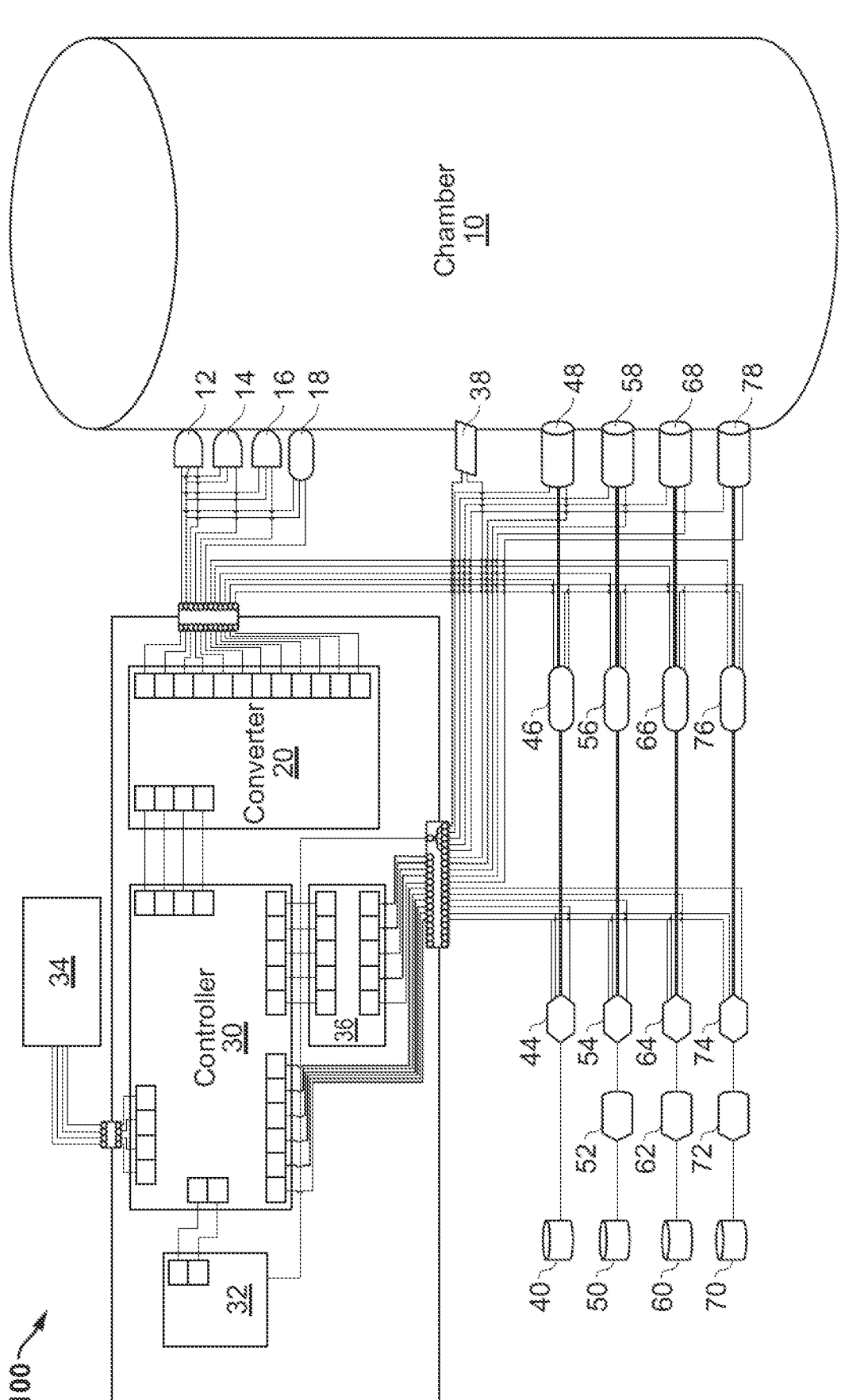
FIG. 2 includes a schematic diagram of a carbon capture system according to an embodiment of the present disclo-sure.

Turning now to a system for synthesis of carbon-based nanomaterial according to embodiments described herein, FIG. 2 includes a diagram of a carbon capture system according to embodiments described herein. As shown in FIG. 2, a carbon capture system 100 according to embodiments of the present disclosure includes a combustion chamber 10 for conversion of hydrocarbon gas or liquid into carbon-based nanomaterial. The system 100 may be scaled as needed and may be located onsite, for example, at a hydrocarbon drilling operation or other suitable hydrocarbon feedstock site. Advantageously, the apparatus and methods disclosed herein permit a wide range of hydrocarbons to be used as a feedstock thereby converting numerous types of carbon-containing fluids, such as industrial flue gas output, to generate a valuable product, e.g., carbon-based nanomaterial. Thus, the disclosure herein beneficially teaches to capture a variety of carbon in industrial outputs and minimize greenhouse gas emissions therefrom while providing a valuable product for further industrial processes, materials, and equipment, for example, carbon-based nanomaterial-coated proton electron membranes. The combustion chamber 10 of FIG. 2 may be a heavy-duty chamber with multiple injection ports for controlled injection of the hydrocarbon material and separate injection of oxygen and hydrogen that forces re-bonding of carbon, hydrogen, and oxygen when ignited to form carbon-based nanomaterial and other products that do not contribute to greenhouse gas emissions, such as water. Without being bound by theory, the use of controlled, separate injection of oxygen and hydrogen allows for a much faster combustion of the hydrocarbon material as compared with traditional oxidizing agents; this permits a more complete breakdown of the hydrocarbon material. The combustion chamber 10 may be formed of any suitable material, such as aluminum, titanium aluminum, nickel aluminum, cast iron, steel, and the like. In some embodiments, the combustion chamber 10 is configured to withstand at least 1000 psi of internal pressure.

The combustion chamber 10 may include one or more sensors configured to monitor and measure conditions within the combustion chamber 10. In some embodiments, the combustion chamber 10 includes a temperature sensor 18 configured to measure a temperature within the combustion chamber 10. In some embodiments, the combustion chamber 10 includes a low pressure sensor 16, a pressure sensor 14, and a high pressure sensor 12, each configured to measure a pressure within the combustion chamber 10. In one or more embodiments, the combustion chamber 10 may include an opacity sensor configured to measure an opacity within the combustion chamber 10. In some embodiments, the combustion chamber 10 may include a vacuum valve configured to create a vacuum within the combustion chamber 10 as a precursor to introducing any reactants (or inert gas). In some embodiments, the combustion chamber 10 includes a pressure release valve configured to release pressure from the combustion chamber 10. The pressure release valve may be actuated once a threshold pressure is reached within the combustion chamber 10 and/or on demand, for example, at a set time after each combustion within the combustion chamber 10.

The system includes an inert gas source 40, a flue gas source 50, an oxygen source 60, and a hydrogen source 70 each in fluidic communication with the combustion chamber 10. The inert gas source 40 is arranged to provide a supply of an inert gas, such as argon, under pressure to the combustion chamber 10, wherein said pressure may be monitored by a pressure sensor 44. The inert gas provides an inert environment for clean combustion within the combustion chamber 10. For instance, the inert environment may prevent or suppress formation of NOx (nitrogen oxides) that might otherwise occur. A flow meter 46 is provided between the inert gas source 40 and the combustion chamber 10 and the flow meter 46 is configured to measure a flow rate of inert gas from the inert gas source 40 into the combustion chamber 10. The inert gas is introduced into the combustion chamber 10 through an injection port 48, which may include a one-way valve in order to maintain pressure within the combustion chamber 10 and avoid flashback. In some embodiments, the one-way valve is a solenoid valve.

The flue gas source 50 supplies a carbon-based gas or liquid to the combustion chamber 10. Suitable carbon-based gases or liquids include a variety of commercial and industrial output products that include carbon, typically in a hydrocarbon, which include but are not limited to carbon dioxide, methane, propane, acetylene, butane, or combinations thereof. The carbon content of the carbon-based gases or liquids is not particularly limited. In some embodiments, the flue gas source 50 is an exhaust stream from an industrial reaction process, such as a coal energy plant, a drilling operation, a combustion engine, or a landfill. In other embodiments, the exhaust stream from said industrial reaction process may be collected and stored in a tank or other vessel that may be used later in the system 100. In some embodiments, the flue gas source 50 comprises a holding tank configured to receive and pressurize the exhaust stream from such an industrial process to provide a consistent feedstock pressure to the apparatus herein. In any embodiment, the flue gas source 50 may include a pressure sensor 54 in communication therewith configured to monitor a pressure of the carbon-based gas or liquid from the flue gas source 50. Between the flue gas source 50 and the combustion chamber 10 is a flow meter 56 configured to measure a flow rate of the carbon-based gas or liquid from the flue gas source 50 into the combustion chamber 10. The carbon-based gas or liquid is introduced into the combustion chamber 10 through an injection port 58, which may include a one-way valve in order to maintain pressure within the combustion chamber 10 and avoid flashback. In some embodiments, the one-way valve is a solenoid valve. In some embodiments, a flash arrester 52 may also be included between the flue gas source 50 and the combustion chamber 10, e.g., between the pressure sensor 54 and the flue gas source 50. The flash arrester 52 may include a sensor configured to detect flashback during the combustion process in the combustion chamber 10 and, in response, shut down the system 100 to minimize or avoid the risk of explosion or fire.

The oxygen source 60 supplies oxygen gas to the combustion chamber 10. In some embodiments, the oxygen source 60 is pressurized at about 50 psi or greater. In some embodiments, the oxygen source 60 receives oxygen from a proton exchange membrane (PEM) electrolyzer and, optionally, pressurizes the oxygen. In other embodiments, the oxygen source 60 comprises an oxygen cylinder. In any embodiment, the oxygen source 60 may include a pressure sensor 64 in communication therewith configured to monitor a pressure of the oxygen from the oxygen source 60. Between the oxygen source 60 and the combustion chamber 10 is a flow meter 66 configured to measure a flow rate of the oxygen from the oxygen source 60 into the combustion chamber 10. The oxygen is introduced into the combustion chamber 10 through an injection port 68, which may include a one-way valve in order to maintain pressure within the combustion chamber 10 and avoid flashback. In some embodiments, the one-way valve is a solenoid valve. In some embodiments, a flash arrester 62 may also be included between the oxygen source 60 and the combustion chamber 10, e.g., between the pressure sensor 64 and the oxygen source 60. The flash arrester 62 may include a sensor configured to detect flashback during the combustion process in the combustion chamber 10 and, in response, shut down the system 100.

The hydrogen source 70 supplies hydrogen gas to the combustion chamber 10. In some embodiments, the hydrogen source 70 is pressurized at about 50 psi or greater. In some embodiments, the hydrogen source 70 receives hydrogen from a proton exchange membrane (PEM) electrolyzer and, optionally, pressurizes the hydrogen. In other embodiments, the hydrogen source 70 comprises a hydrogen cylinder. In any embodiment, the hydrogen source 70 may include a pressure sensor 74 in communication therewith configured to monitor a pressure of the hydrogen from the hydrogen source 70. Between the hydrogen source 70 and the combustion chamber 10 is a flow meter 76 configured to measure a flow rate of the hydrogen from the hydrogen source 70 into the combustion chamber 10. The hydrogen is introduced into the combustion chamber 10 through an injection port 78, which may include a one-way valve in order to maintain pressure within the combustion chamber 10 and avoid flashback. In some embodiments, the one-way valve is a solenoid valve. In some embodiments, a flash arrester 72 may also be included between the hydrogen source 70 and the combustion chamber 10, e.g., between the pressure sensor 74 and the hydrogen source 70. The flash arrester 72 may include a sensor configured to detect flashback during the combustion process in the combustion chamber 10 and, in response, shut down the system 100.

The combustion chamber 10 includes an ignition device 38, such as a spark plug. The ignition device 38 is configured to initiate a series of precisely timed combustions. For example, each combustion event may last about a millisecond. The spacing between combustions and the duration of combustions may be appropriately adjusted based on the measured conditions of the system 100. In one or more embodiments, the ignition device 38 is positioned at a mid-point of the combustion chamber 10. According to this configuration, as particles of the reactants (flue gas, oxygen, and hydrogen) accelerate in each direction the particles hit at each end and assemble the carbon-based nanomaterial.

The system 100 also includes a controller 30 configured to receive inputs from the sensors within the system 100 and to control combustion conditions within the combustion chamber 10. In some embodiments, the controller 30 is configured to receive inputs from one or more of the flow meters 46, 56, 66, 76, the temperature sensor 18, the low pressure sensor 16, the pressure sensor 14, the high pressure sensor 12, and the pressure sensors 44, 54, 64, 74. In some embodiments, the controller 30 comprises a converter 20 configured to receive said inputs as analog signals and convert the analog signals into digital signals.

The controller 30 may also include a driver 36. In some embodiments, the driver 36 is configured to actuate one or more of the solenoid valves at injection ports 48, 58, 68, 78 and/or to actuate the ignition device 38. In some embodiments, the controller 30 may also include a power distributor 32 to distribute power throughout the system, for example, to the solenoid valves at injection ports 48, 58, 68, 78 and to the ignition device 38.

In one or more embodiments, the system 100 includes a user interface 34. The user interface 34 may display any one or more of the measurements from the sensors described above. In some embodiments, the user interface 34 may be configured to allow customization of the combustion conditions, such as flow rates, pressure, and temperature. The user interface 34 may allow for individual control of each parameter of the system 100 and/or may include pre-programmed functions.

In one or more embodiments, the combustion chamber 10 is maintained at about 100° F. or less before combustion, which helps build pressure once carbon-based nanomaterial is produced. After combustion, the temperature within the combustion chamber 10 may be around about 120° F. In some embodiments, a pressure within the combustion chamber 10 is maintained at about 5 to 20 psi prior to combustion. In some embodiments, a pressure within the combustion chamber 10 before combustion is about one half that of a pressure after combustion, for example to about 10 to 40 psi, to facilitate efficient conversion of the carbon-based flue gas into carbon-based nanomaterial production.

In some embodiments, the system 100 may be automated to achieve a cost-efficient carbon-based nanomaterial production method on- or off-site. The automated system 100 determines the mixture for each internal combustion in the chamber to produce carbon-based nanomaterial in real time. In other embodiments, through the use of the user interface 34, the system 100 may be manually controlled.

In any embodiment, the system 100 may be configured to measure, in real-time, the make-up of the carbon-based gas or liquid. Such a measurement may be, for example, derived from the measured temperature and pressure changes within the combustion chamber 10 during and after combustion. The ratios of the carbon-based gas or liquid, hydrogen, and oxygen may be precisely adjusted to achieve a consistent carbon-based nanomaterial product, to modify the conversion of carbon from the carbon-based feedstock into carbon-based nanomaterial to increase the yield thereof, or ideally, both. After each combustion, the system 100 makes small adjustments as needed to one or more parameters to improve the efficiency of carbon-based nanomaterial production. A number of combustions may be required to reach optimal combustion conditions for a given carbon-based gas or liquid. However, the precise control of each of the input reactants allows the system 100 to operate with a wide range of carbon sources—even with a variable carbon source.

According to still other embodiments, the carbon-based nanomaterial composition formed according to embodiments described herein may be used to form a carbon-based nanomaterial-based cathode or a carbon-based nanomaterial-based anode.

Figure 3:
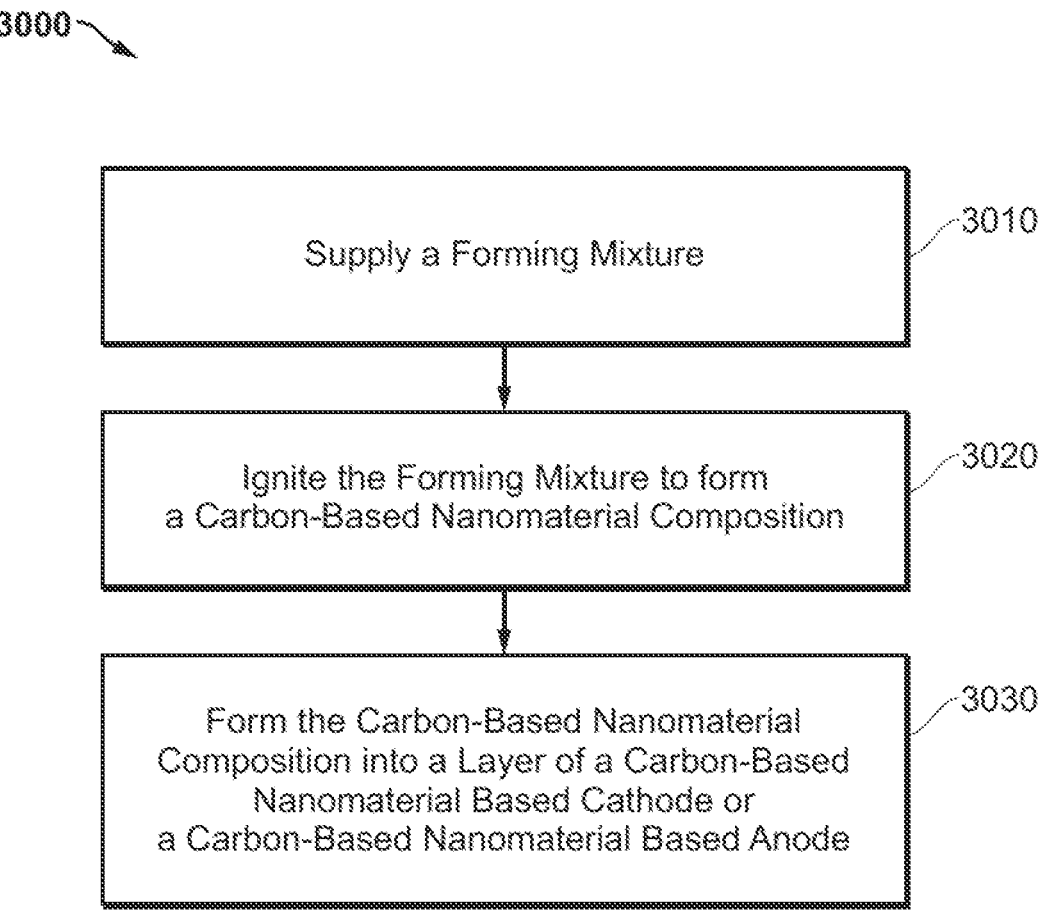
FIG. 3 includes a diagram showing a carbon-based nano-material-based cathode or a carbon-based nanomaterial-based anode forming method according to embodiments described herein.

Referring to a method of forming a carbon-based nanomaterial-based cathode or a carbon-based nanomaterial-based anode, FIG. 3 includes a diagram showing a forming method 300 for forming a carbon-based nanomaterial-based cathode or a carbon-based nanomaterial-based anode according to embodiments described herein. According to particular embodiments, the forming method 3000 may include a first step 3010 of supplying a forming mixture, a second step 3020 of igniting the forming mixture to form the carbon-based nanomaterial composition, and a third step 3030 of forming the carbon-based nanomaterial composition into a layer of a carbon-based nanomaterial-based cathode or a carbon-based nanomaterial-based anode.

According to particular embodiments, the carbon-based nanomaterial-based cathode or the carbon-based nanomaterial-based anode of embodiments described herein may be used in various applications including, but not limited to, a PEM fuel cell, a PEM electrolyzer, a battery, or a capacitor.

According to still other embodiments, a fuel cell may include the carbon-based nanomaterial composition formed according to embodiments described herein. According to still other embodiments, the carbon-based nanomaterial composition formed according to embodiments described herein may be used to form a component of a fuel cell.

According to still other embodiments, an electrolyzer may include the carbon-based nanomaterial composition formed according to embodiments described herein. According to still other embodiments, the carbon-based nanomaterial composition formed according to embodiments described herein may be used to form a component of an electrolyzer.

According to still other embodiments, a battery may include the carbon-based nanomaterial composition formed according to embodiments described herein. According to still other embodiments, the carbon-based nanomaterial composition formed according to embodiments described herein may be used to form a component of a battery.

According to still other embodiments, a capacitor may include the carbon-based nanomaterial composition formed according to embodiments described herein. According to still other embodiments, the carbon-based nanomaterial composition formed according to embodiments described herein may be used to form a component of a capacitor.

According to still other embodiments, a conductive coating may include the carbon-based nanomaterial composition formed according to embodiments described herein. According to still other embodiments, the carbon-based nanomaterial composition formed according to embodiments described herein may be used to form a component of a conductive coating.

According to still other embodiments, a super conductor may include the carbon-based nanomaterial composition formed according to embodiments described herein. According to still other embodiments, the carbon-based nanomaterial composition formed according to embodiments described herein may be used to form a component of a super conductor.

According to still other embodiments, an energy storage device may include the carbon-based nanomaterial composition formed according to embodiments described herein. According to still other embodiments, the carbon-based nanomaterial composition formed according to embodiments described herein may be used to form a component of an energy storage device.

According to still other embodiments, an energy transfer device may include the carbon-based nanomaterial composition formed according to embodiments described herein. According to still other embodiments, the carbon-based nanomaterial composition formed according to embodiments described herein may be used to form a component of an energy transfer device.

Turning now to other particular applications or uses of carbon-based nanomaterial formed according to embodiments described herein, the carbon-based nanomaterial may be used in various applications. For example, according to certain embodiments, the carbon-based nanomaterial may be used in the formation of concrete. According to particular embodiments, a concrete mixture may include carbon-based nanomaterial having any of the characteristics described herein. Without being tied to any particular theory, the carbon-based nanomaterial may improve structural performance of the concrete, such as reducing slump, increasing time to usable cure or reducing water demand. According to still other embodiments, the carbon-based nanomaterial may improve the thermal properties of the concrete.

According to still other embodiments, the carbon-based nanomaterial may be used in the formation of building materials, such as, bricks. According to certain embodiments, building materials may include carbon-based nanomaterial having any of the characteristics described herein. According to still other embodiments, bricks may include carbon-based nanomaterial having any of the characteristics described herein. Without being tied to any particular theory, the carbon-based nanomaterial may improve the conductivity of the building materials or bricks. According to still other embodiments, the carbon-based nanomaterial may improve the structural performance of the building materials or bricks. According to still other embodiments, the carbon-based nanomaterial may improve the thermal properties of the building materials or bricks.

According to yet other embodiments, the carbon-based nanomaterial may be used in the formation of oil. According to certain embodiments, oil may include carbon-based nanomaterial having any of the characteristics described herein. Without being tied to any particular theory, the carbon-based nanomaterial may improve the friction reduction properties of the oil. According to still other embodiments, the carbon-based nanomaterial may improve the thermal properties of the oil.

According to still other embodiments, the carbon-based nanomaterial may be used in the formation of filters. According to certain embodiments, filters may include carbon-based nanomaterial having any of the characteristics described herein. Without being tied to any particular theory, the carbon-based nanomaterial may improve the performance of the filters.

According to still other embodiments, the carbon-based nanomaterial may be used in radio frequency energy harvesting. Without being tied to any particular theory, the carbon-based nanomaterial may improve long distance energy transfer.

According to yet other embodiments, the carbon-based nanomaterial may be used in the formation of capacitors. According to certain embodiments, capacitors may include carbon-based nanomaterial having any of the characteristics described herein. Without being tied to any particular theory, the carbon-based nanomaterial may improve the energy density of the capacitors. According to still other embodiments, the carbon-based nanomaterial may improve the charge and discharge rate of the capacitors.

According to yet other embodiments, the carbon-based nanomaterial may be used in geothermal processes. Without being tied to any particular theory, the carbon-based nanomaterial may improve the thermal properties of geothermal processes.

According to yet other embodiments, the carbon-based nanomaterial may be used in the formation of paint, paint durability and paint adhesion. According to certain embodiments, paint may include carbon-based nanomaterial having any of the characteristics described herein. Without being tied to any particular theory, the carbon-based nanomaterial may improve the corrosion resistance of the paint. According to still other embodiments, the carbon-based nanomaterial may improve the thermal properties of the paint. According to yet other embodiments, the carbon-based nanomaterial may improve the color properties of the paint. According to yet other embodiments, the carbon-based nanomaterial may improve durability of the paint. According to other embodiments, the carbon-based nanomaterial may improve the adhesion of the paint.

According to yet other embodiments, the carbon-based nanomaterial may be used in the formation of coolant. According to certain embodiments, coolant may include carbon-based nanomaterial having any of the characteristics described herein. Without being tied to any particular theory, the carbon-based nanomaterial may improve the thermal properties of the coolant. According to yet other embodiments, the carbon-based nanomaterial may improve the flow of the coolant due to a reduction of friction.

According to yet other embodiments, the carbon-based nanomaterial may be used in the formation of metal. According to certain embodiments, metal may include carbon-based nanomaterial having any of the characteristics described herein. Without being tied to any particular theory, the carbon-based nanomaterial may improve the structural properties of the metal. According to still other embodiments, the carbon-based nanomaterial may improve the thermal properties of the metal. According to still other embodiments, the carbon-based nanomaterial may improve the corrosion properties of the metal. According to yet other embodiments, the carbon-based nanomaterial may improve the flexibility of the metal. According to yet other embodiments, the carbon-based nanomaterial may improve the durability of the metal.

According to yet other embodiments, the carbon-based nanomaterial may be used in the formation of tire additives. According to certain embodiments, tire additives may include carbon-based nanomaterial having any of the characteristics described herein. Without being tied to any particular theory, the carbon-based nanomaterial may improve the wear, color, thermal properties, or grip of tire additives.

According to yet other embodiments, the carbon-based nanomaterial may be used in the formation of various household or commercial counter tops. According to certain embodiments, household or commercial counter tops may include carbon-based nanomaterial having any of the characteristics described herein. Without being tied to any particular theory, the carbon-based nanomaterial may improve the strength of the household or commercial counter tops. According to still other embodiments, the carbon-based nanomaterial may improve the scratch and wear resistance of the household or commercial counter tops. According to yet other embodiments, the carbon-based nanomaterial may improve the thermal properties of the household or commercial counter tops.

According to yet other embodiments, the carbon-based nanomaterial may be used in the formation of digital displays. According to certain embodiments, digital displays may include carbon-based nanomaterial having any of the characteristics described herein.

According to yet other embodiments, the carbon-based nanomaterial may be used in the formation of sunscreen. According to certain embodiments, sunscreen may include carbon-based nanomaterial having any of the characteristics described herein. Without being tied to any particular theory, the carbon-based nanomaterial may improve the thermal properties of the sunscreen.

According to yet other embodiments, the carbon-based nanomaterial may be used in the formation of soap or shampoo. According to certain embodiments, soap or shampoo may include carbon-based nanomaterial having any of the characteristics described herein. Without being tied to any particular theory, the carbon-based nanomaterial may improve the cleanability of the soap or shampoo.

According to yet other embodiments, the carbon-based nanomaterial may be used in the formation of non-stick or thermally conductive coating for pots and pans. According to certain embodiments, non-stick or thermally conductive coating for pots and pans may include carbon-based nanomaterial having any of the characteristics described herein. Without being tied to any particular theory, the carbon-based nanomaterial may improve the thermal properties of the non-stick or thermally conductive coating for pots and pans.

According to yet other embodiments, the carbon-based nanomaterial may be used in the formation of sunglasses. According to certain embodiments, sunglasses may include carbon-based nanomaterial having any of the characteristics described herein. Without being tied to any particular theory, the carbon-based nanomaterial may improve the thermal properties of the sunglasses. According to still other embodiments, the carbon-based nanomaterial may improve the UV absorption of the sunglasses.

According to yet other embodiments, the carbon-based nanomaterial may be used in the formation of Wi-Fi antennas. According to certain embodiments, Wi-Fi antennas may include carbon-based nanomaterial having any of the characteristics described herein. Without being tied to any particular theory, the carbon-based nanomaterial may improve the signal reception of Wi-Fi antennas.

According to yet other embodiments, the carbon-based nanomaterial may be used in the formation of textiles. According to certain embodiments, textiles may include carbon-based nanomaterial having any of the characteristics described herein.

According to yet other embodiments, the carbon-based nanomaterial may be used in the formation of glass. According to certain embodiments, glass may include carbon-based nanomaterial having any of the characteristics described herein. Without being tied to any particular theory, the carbon-based nanomaterial may improve the thermal properties of the glass. According to still other embodiments, the carbon-based nanomaterial may improve the structural properties of glass. According to yet other embodiments, the carbon-based nanomaterial may improve the color properties of glass.

According to yet other embodiments, the carbon-based nanomaterial may be used in the formation of solar panels. According to certain embodiments, solar panels may include carbon-based nanomaterial having any of the characteristics described herein. Without being tied to any particular theory, the carbon-based nanomaterial may improve the conductivity, light absorption, or strength of solar panels. According to still other embodiments, the carbon-based nanomaterial may improve the thermal properties of solar panels.

According to yet other embodiments, the carbon-based nanomaterial may be used in the formation of solar epoxy. According to certain embodiments, epoxy may include carbon-based nanomaterial having any of the characteristics described herein. Without being tied to any particular theory, the carbon-based nanomaterial may improve the tensile strength and performance of epoxy. According to still other embodiments, the carbon-based nanomaterial may improve the thermal properties of epoxy.

According to yet other embodiments, the carbon-based nanomaterial may be used in the formation of solar power windows. According to certain embodiments, solar power windows may include carbon-based nanomaterial having any of the characteristics described herein.

According to yet other embodiments, the carbon-based nanomaterial may be used in the formation of ceramic additives. According to certain embodiments, ceramic additives may include carbon-based nanomaterial having any of the characteristics described herein. Without being tied to any particular theory, the carbon-based nanomaterial may improve the thermal properties of the ceramic additives. According to still other embodiments, the carbon-based nanomaterial may improve the structural properties of ceramic additives. According to yet other embodiments, the carbon-based nanomaterial may improve the color properties of ceramic additives.

According to yet other embodiments, the carbon-based nanomaterial may be used in the formation of biomedical implants. According to certain embodiments, biomedical implants may include carbon-based nanomaterial having any of the characteristics described herein.

According to yet other embodiments, the carbon-based nanomaterial may be used in the paper and pulp industry.

According to yet other embodiments, the carbon-based nanomaterial may be used in the formation of reversible hydrogen storage materials.

According to yet other embodiments, the carbon-based nanomaterial may be used in the formation of polishing compound additives.

According to yet other embodiments, the carbon-based nanomaterial may be used in the sports industry.

According to yet other embodiments, the carbon-based nanomaterial may be used in the formation of weather stripping.

According to yet other embodiments, the carbon-based nanomaterial may be used in the formation of light weight personnel armor that is light and more resilient bullet proof clothing.

According to yet other embodiments, the carbon-based nanomaterial may be used in the formation of carbon hex, which may provide structural integrity for other materials.

According to yet other embodiments, the carbon-based nanomaterial may be used in the formation of grease. According to certain embodiments, grease may include carbon-based nanomaterial having any of the characteristics described herein. Without being tied to any particular theory, the carbon-based nanomaterial may improve the thermal properties of the grease. According to still other embodiments, the carbon-based nanomaterial may improve the lubrication of grease. According to yet other embodiments, the carbon-based nanomaterial may improve the color properties of grease.

According to yet other embodiments, the carbon-based nanomaterial may be used in the formation of adhesives. According to certain embodiments, adhesives may include carbon-based nanomaterial having any of the characteristics described herein. Without being tied to any particular theory, the carbon-based nanomaterial may improve the surface area of the adhesives. According to still other embodiments, the carbon-based nanomaterial may improve the thermal properties of the adhesives.

According to still other embodiments, the carbon-based nanomaterial may be used in the formation of roofing materials, such as, shingles, tar coatings, metal roofing materials. According to certain embodiments, roofing materials may include carbon-based nanomaterial having any of the characteristics described herein. According to still other embodiments, the carbon-based nanomaterial may improve the structural performance of the roofing materials. According to still other embodiments, the carbon-based nanomaterial may improve the thermal properties of the roofing materials.

According to still other embodiments, the carbon-based nanomaterial may be used in the formation of soil. According to certain embodiments, soil may include carbon-based nanomaterial having any of the characteristics described herein. According to still other embodiments, the carbon-based nanomaterial may improve soil stabilization (anti-hydro faction) and soil amendment (nutrients).

According to yet other embodiments, the carbon-based nanomaterial may be used in the formation of fire extinguishers or fire retardants, such as blankets.

According to yet other embodiments, the carbon-based nanomaterial may be used in the formation of batteries.

According to yet other embodiments, the carbon-based nanomaterial may be used in the formation of fuel cell catalysts.

According to yet other embodiments, the carbon-based nanomaterial may be used in the formation of or operation of nuclear power plants.

According to yet other embodiments, the carbon-based nanomaterial may be used in alcohol distillation or water purification.

According to yet other embodiments, the carbon-based nanomaterial may be used in the formation of drug delivery systems.

According to yet other embodiments, the carbon-based nanomaterial may be used in the formation of cancer treatments.

According to yet other embodiments, the carbon-based nanomaterial may be used in the formation of gene delivery.

According to yet other embodiments, the carbon-based nanomaterial may be used in diabetes monitoring.

According to yet other embodiments, the carbon-based nanomaterial may be used in the formation of biosensors.

According to yet other embodiments, the carbon-based nanomaterial may be used in the formation of light generators.

According to yet other embodiments, the carbon-based nanomaterial may be used in the formation of transistors.

According to yet other embodiments, the carbon-based nanomaterial may be used in the formation of water proofing materials.

According to yet other embodiments, the carbon-based nanomaterial may be used in the formation of wearable proofing.

According to yet other embodiments, the carbon-based nanomaterial may be used in the formation of wearable electronics.

According to yet other embodiments, the carbon-based nanomaterial may be used in the formation of touch screens.

According to yet other embodiments, the carbon-based nanomaterial may be used in the formation of flexible screens.

According to yet other embodiments, the carbon-based nanomaterial may be used in the formation of food packaging.

According to yet other embodiments, the carbon-based nanomaterial may be used in desalination processes.

According to yet other embodiments, the carbon-based nanomaterial may be used in the formation or in combination with gasoline. According to certain embodiments, gasoline may include carbon-based nanomaterial having any of the characteristics described herein.

According to yet other embodiments, the carbon-based nanomaterial may be used in the formation or in combination with ethanol or ethanol-based fuels. According to certain embodiments, ethanol or ethanol-based fuels may include carbon-based nanomaterial having any of the characteristics described herein.

According to yet other embodiments, the carbon-based nanomaterial may be used in the formation or in combination with cancer-targeting materials, such as peptides, or other known proteins. According to certain embodiments, cancer-targeting materials may include carbon-based nanomaterial having any of the characteristics described herein.

According to yet other embodiments, the carbon-based nanomaterial may be used in the formation or in combination with medical drug delivery systems, in particular, nano-drug delivery systems. According to certain embodiments, drug delivery systems may include carbon-based nanomaterial having any of the characteristics described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A carbon-based nanomaterial composition formed from a forming mixture comprising a gas mixture and a bromine precursor component, wherein the gas mixture comprises a carbon-based gas, an oxygen gas, and a hydrogen gas, wherein the carbon-based nanomaterial composition comprises bromine doped nanospheres.

Embodiment 2. A method of forming a carbon-based nanomaterial composition, wherein the method comprises: supplying a forming mixture comprising a gas mixture and a bromine precursor component, wherein the gas mixture comprises a carbon-based gas, an oxygen gas, and a hydrogen gas, igniting the gas mixture to form the carbon-based nanomaterial composition, wherein the carbon-based nanomaterial composition comprises bromine doped nanospheres.

Embodiment 3. A carbon-based nanomaterial composition comprising: bromine doped nanospheres, a carbon content of at least about 60% and not greater than about 99% based on elemental analysis of the carbon-based nanomaterial composition, an oxygen content of at least about 0.0% and not greater than about 35% based on elemental analysis of the carbon-based nanomaterial composition, and a bromine content of at least about 1% and not greater than 50%.

Embodiment 4. The carbon-based nanomaterial composition or method of any one of embodiments 1, 2, and 3, wherein the bromine doped nanospheres have an average diameter of at least about 5 nm.

Embodiment 5. The carbon-based nanomaterial composition or method of any one of embodiments 1, 2, and 3, wherein the bromine doped nanospheres have an average diameter of not greater than about 500 nm.

Embodiment 6. The carbon-based nanomaterial composition or method of any one of embodiments 1, 2, and 3, wherein the carbon-based nanomaterial composition comprises a bromine content of at least about 1% based on elemental analysis of the carbon-based nanomaterial composition.

Embodiment 7. The carbon-based nanomaterial composition or method of any one of embodiments 1, 2, and 3, wherein the carbon-based nanomaterial composition comprises a bromine content of not greater than about 50% based on elemental analysis of the carbon-based nanomaterial composition.

Embodiment 8. The carbon-based nanomaterial composition or method of any one of embodiments 1, 2, and 3, wherein the carbon-based nanomaterial composition comprises a carbon content of at least about 60% based on elemental analysis of the carbon-based nanomaterial composition.

Embodiment 9. The carbon-based nanomaterial composition or method of any one of embodiments 1, 2, and 3, wherein the carbon-based nanomaterial composition comprises a carbon content of not greater than about 99% based on elemental analysis of the carbon-based nanomaterial composition.

Embodiment 10. The carbon-based nanomaterial composition or method of any one of embodiments 1, 2, and 3, wherein the carbon-based nanomaterial composition comprises an oxygen content of at least about 1% based on elemental analysis of the carbon-based nanomaterial composition.

Embodiment 11. The carbon-based nanomaterial composition or method of any one of embodiments 1, 2, and 3, wherein the carbon-based nanomaterial composition comprises an oxygen content of not greater than about 35% based on elemental analysis of the carbon-based nanomaterial composition.

Embodiment 12. The carbon-based nanomaterial composition or method of any one of embodiments 1, 2, and 3, wherein the carbon-based nanomaterial composition comprises a carbon hybridization ratio $P_{sp3}/P_{sp2}$ of at least about 0.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 13. The carbon-based nanomaterial composition or method of any one of embodiments 1, 2, and 3, wherein the carbon-based nanomaterial has a carbon hybridization ratio $P_{sp3}/P_{sp2}$ of not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 14. The carbon-based nanomaterial composition or method of any one of embodiments 1, 2, and 3, wherein the carbon-based nanomaterial composition comprises a D/G ratio of not greater than about 0.1.

Embodiment 15. The carbon-based nanomaterial composition or method of any one of embodiments 1, 2, and 3, wherein the carbon-based nanomaterial composition comprises a D/G ratio of at least about 2.0.

Embodiment 16. The carbon-based nanomaterial composition or method of any one of embodiments 1, 2, and 3, wherein the carbon-based nanomaterial composition comprises an aspect ratio of not greater than about 100.

Embodiment 17. The carbon-based nanomaterial composition or method of any one of embodiments 1, 2, and 3, wherein the carbon-based nanomaterial composition comprises an aspect ratio of at least about 1.

Embodiment 18. The carbon-based nanomaterial composition or method of any one of embodiments 1, 2, and 3, wherein the bromine doped nanospheres further comprises a secondary dopant.

Embodiment 19. The carbon-based nanomaterial composition or method of embodiment 18, wherein the secondary dopant comprises bromine, chlorine, iodine, nitrogen, oxygen, phosphorous, silicon, silicon dioxide, sodium, or any combination thereof.

Embodiment 20. The carbon-based nanomaterial composition or method of any one of embodiments 1, 2, and 3, wherein the carbon-based nanomaterial composition is formed from a forming mixture, wherein the forming mixture comprises a gas mixture and a bromine precursor component.

Embodiment 21. The carbon-based nanomaterial composition or method of any one of embodiments 1, 2, and 20, wherein the forming mixture comprises the gas mixture at a concentration of at least about 50 vol. % for a total volume of the forming mixture.

Embodiment 22. The carbon-based nanomaterial composition or method of any one of embodiments 1, 2, and 20, wherein the forming mixture comprises the bromine precursor component at a concentration of not greater than about 98 vol. % for a total volume of the forming mixture.

Embodiment 23. The carbon-based nanomaterial composition or method of any one of embodiments 1, 2, and 20, wherein the forming mixture comprises the bromine precursor component at a concentration of at least about 2 vol. % for a total volume of the forming mixture.

Embodiment 24. The carbon-based nanomaterial composition or method of any one of embodiments 1, 2, and 20, wherein the forming mixture comprises the gas mixture at a concentration of not greater than about 50 vol. % for a total volume of the mixture.

Embodiment 25. The carbon-based nanomaterial composition or method of any one of embodiments 1, 2, and 20, wherein the gas mixture comprises the carbon-based gas at a concentration of at least about 0.8 mol.

Embodiment 26. The carbon-based nanomaterial composition or method of any one of embodiments 1, 2, and 20, wherein the gas mixture comprises the carbon-based gas at a concentration of not greater than about 18 mol.

Embodiment 27. The carbon-based nanomaterial composition or method of any one of embodiments 1, 2, and 20, wherein the carbon-based gas comprises acetylene gas, methane gas or any combination thereof.

Embodiment 28. The carbon-based nanomaterial composition or method of any one of embodiments 1, 2, and 20, wherein the gas mixture comprises oxygen gas at a concentration of at least about 0.1 mol.

Embodiment 29. The carbon-based nanomaterial composition or method of any one of embodiments 1, 2, and 20, wherein the gas mixture comprises oxygen gas at a concentration of not greater than about 13.0 mol.

Embodiment 30. The carbon-based nanomaterial composition or method of any one of embodiments 1, 2, and 20, wherein the gas mixture comprises hydrogen gas at a concentration of at least about 0.0 mol.

Embodiment 31. The carbon-based nanomaterial composition or method of any one of embodiments 1, 2, and 20, wherein the gas mixture comprises hydrogen gas at a concentration of not greater than about 20 mol.

Embodiment 32. The carbon-based nanomaterial composition or method of any one of embodiments 1, 2, and 20, wherein the gas mixture comprises acetylene gas at a concentration of at least about 0.8 mol.

Embodiment 33. The carbon-based nanomaterial composition or method of any one of embodiments 1, 2, and 20, wherein the gas mixture comprises acetylene gas at a concentration of not greater than about 18 mol.

Embodiment 34. The carbon-based nanomaterial composition or method of any one of embodiments 1, 2, and 20, wherein the gas mixture comprises methane gas at a concentration of at least about 0.8 mol.

Embodiment 35. The carbon-based nanomaterial composition or method of any one of embodiments 1, 2, and 20, wherein the gas mixture comprises methane gas at a concentration of not greater than about 20.0 mol.

Embodiment 36. The carbon-based nanomaterial composition or method of any one of embodiments 1, 2, and 3, wherein the carbon-based nanomaterial composition is formed at a combustion temperature of at least about 1500° C.

Embodiment 37. The carbon-based nanomaterial composition or method of any one of embodiments 1, 2, and 3, wherein the carbon-based nanomaterial composition is formed at a combustion temperature of not greater than about 3000° C.

Embodiment 38. The carbon-based nanomaterial composition or method of any one of embodiments 1, 2, and 3, wherein the carbon-based nanomaterial composition is formed at a combustion pressure of at least about 200 PSI.

Embodiment 39. The carbon-based nanomaterial composition or method of any one of embodiments 1, 2, and 3, wherein the carbon-based nanomaterial composition is formed at a combustion pressure of not greater than about 3000 PSI.

Embodiment 40. The carbon-based nanomaterial composition or method of any one of embodiments 1, 2, and 3, wherein the forming mixture further comprises a secondary dopant precursor component.

Embodiment 41. The carbon-based nanomaterial composition or method of embodiment 40, wherein the secondary dopant comprises a boron precursor component, a chlorine precursor component, an iodine precursor component, a nitrogen precursor component, an oxygen precursor component, a phosphorous precursor component, a silicon precursor component, a silicon dioxide precursor component, a sodium precursor component, or any combination thereof.

Embodiment 42. The carbon-based nanomaterial composition or method of any one of embodiments 1, 2, and 3, wherein the carbon-based nanomaterial composition is formed in a system for carbon-based nanomaterial synthesis, wherein the system comprises: an enclosed chamber comprising a hollow interior; a carbon-based gas source fluidically coupled to the chamber and configured to supply a carbon-based gas to the hollow interior; a hydrogen source that is independent of the carbon-based gas source and that is fluidically coupled to the chamber and configured to supply hydrogen to the hollow interior; an oxygen source that is independent of the carbon-based gas source and that is fluidically coupled to the chamber and configured to supply oxygen to the hollow interior; an igniter configured to ignite the carbon-based gas, hydrogen, and oxygen in the hollow interior; a first flow meter coupled to the carbon-based gas source, a second flow meter coupled to the hydrogen source, a third flow meter coupled to the oxygen source; and a controller in communication with and configured to receive flow data from the first, second, and third flow meters; wherein the controller is configured to adjust flow from one or more of the carbon-based gas source, the hydrogen source, and/or the oxygen source in response to the flow data.

Embodiment 43. The carbon-based nanomaterial composition or method of embodiment 42, wherein the carbon-based gas is a flue gas resulting from an industrial reaction process.

Embodiment 44. The carbon-based nanomaterial composition or method of embodiment 43, wherein the industrial reaction process is a coal energy plant, a drilling operation, a combustion engine, or a landfill.

Embodiment 45. The carbon-based nanomaterial composition or method of embodiment 43, wherein the carbon-based gas source comprises a storage tank, an inlet line, and an outlet line; wherein the storage tank is coupled to the chamber via the outlet line; and wherein the flue gas is directed from the industrial reaction process through the inlet line to the storage tank.

Embodiment 46. The carbon-based nanomaterial composition or method of embodiment 43, wherein the chamber is co-located with the industrial reaction process.

Embodiment 47. The carbon-based nanomaterial composition or method of embodiment 42, further comprising an inert gas source fluidically coupled to the chamber and configured to supply an inert gas to the hollow interior.

Embodiment 48. The carbon-based nanomaterial composition or method of embodiment 42, wherein the carbon-based gas source is coupled to the chamber via a first one-way valve, the hydrogen source is coupled to the chamber via a second one-way valve, and the oxygen source is coupled to the chamber via a third one-way valve.

Embodiment 49. The carbon-based nanomaterial composition or method of embodiment 48, wherein the chamber further comprises an exhaust valve.

Embodiment 50. The carbon-based nanomaterial composition or method of embodiment 42, further comprising a pressure sensor configured to measure a pressure within the hollow interior and a temperature sensor configured to measure a temperature within the hollow interior; wherein the controller is in communication with and configured to receive pressure data from the pressure sensor; wherein the controller is in communication with and configured to receive temperature data from the temperature sensor; and wherein the controller is configured to adjust flow from one or more of the carbon-based gas source, the hydrogen source, and the oxygen source in response to the flow data, the pressure data, the temperature data, or a combination thereof.

Embodiment 51. A fuel cell comprising the carbon-based nanomaterial composition of any one of the previous embodiments.

Embodiment 52. An electrolyzer comprising the carbon-based nanomaterial composition of any one of the previous embodiments.

Embodiment 53. A battery comprising the carbon-based nanomaterial composition of any one of the previous embodiments.

Embodiment 54. A capacitor comprising the carbon-based nanomaterial composition of any one of the previous embodiments.

Embodiment 55. A conductive coating comprising the carbon-based nanomaterial composition of any one of the previous embodiments.

Embodiment 56. A super conductor comprising the carbon-based nanomaterial composition of any one of the previous embodiments.

Embodiment 57. An energy storage device comprising the carbon-based nanomaterial composition of any one of the previous embodiments.

Embodiment 58. An energy transfer device comprising the carbon-based nanomaterial composition of any one of the previous embodiments.

Embodiment 59. A carbon-based nanomaterial-based cathode or a carbon-based nanomaterial-based anode comprising a layer of a carbon-based nanomaterial composition formed from a forming mixture comprising a gas mixture and a bromine precursor component, wherein the gas mixture comprises a carbon-based gas, an oxygen gas, and a hydrogen gas, wherein the carbon-based nanomaterial composition comprises bromine doped nanospheres.

Embodiment 60. A method of forming a carbon-based nanomaterial-based cathode or a carbon-based nanomaterial-based anode, wherein the method comprises: supplying a forming mixture comprising a gas mixture and a bromine precursor component, wherein the gas mixture comprises a carbon-based gas, an oxygen gas, and a hydrogen gas, igniting the gas mixture to form the carbon-based nanomaterial composition, wherein the carbon-based nanomaterial composition comprises bromine doped nanospheres, and forming the carbon-based nanomaterial composition into a layer of the carbon-based nanomaterial-based cathode or the carbon-based nanomaterial-based anode.

Embodiment 61. A carbon-based nanomaterial-based cathode or a carbon-based nanomaterial-based anode comprising a layer of a carbon-based nanomaterial composition, wherein the carbon-based nanomaterial composition comprises: bromine doped nanospheres, a carbon content of at least about 60% and not greater than about 99% based on elemental analysis of the carbon-based nanomaterial composition, and an oxygen content of at least about 0% and not greater than about 35% based on elemental analysis of the carbon-based nanomaterial composition, and a bromine content of at least about 2% and not greater than 50%.

Embodiment 62. The carbon-based nanomaterial-based cathode, carbon-based nanomaterial-based anode, or method of any one of embodiments 59, 60, and 61, wherein the bromine doped nanospheres have an average diameter of at least about 5 nm.

Embodiment 63. The carbon-based nanomaterial-based cathode, carbon-based nanomaterial-based anode, or method of any one of embodiments 59, 60, and 61, wherein the bromine doped nanospheres have an average diameter of not greater than about 500 nm.

Embodiment 64. The carbon-based nanomaterial-based cathode, carbon-based nanomaterial-based anode, or method of any one of embodiments 59, 60, and 61, wherein the carbon-based nanomaterial composition comprises a bromine content of at least about 2% based on elemental analysis of the carbon-based nanomaterial composition.

Embodiment 65. The carbon-based nanomaterial-based cathode, carbon-based nanomaterial-based anode, or method of any one of embodiments 59, 60, and 61, wherein the carbon-based nanomaterial composition comprises a bromine content of not greater than about 50% based on elemental analysis of the carbon-based nanomaterial composition.

Embodiment 66. The carbon-based nanomaterial-based cathode, carbon-based nanomaterial-based anode, or method of any one of embodiments 59, 60, and 61, wherein the carbon-based nanomaterial composition comprises a carbon content of at least about 60% based on elemental analysis of the carbon-based nanomaterial composition.

Embodiment 67. The carbon-based nanomaterial-based cathode, carbon-based nanomaterial-based anode, or method of any one of embodiments 59, 60, and 61, wherein the carbon-based nanomaterial composition comprises a carbon content of not greater than about 99% based on elemental analysis of the carbon-based nanomaterial composition.

Embodiment 68. The carbon-based nanomaterial-based cathode, carbon-based nanomaterial-based anode, or method of any one of embodiments 59, 60, and 61, wherein the carbon-based nanomaterial composition comprises an oxygen content of at least about 1% based on elemental analysis of the carbon-based nanomaterial composition.

Embodiment 69. The carbon-based nanomaterial-based cathode, carbon-based nanomaterial-based anode, or method of any one of embodiments 59, 60, and 61, wherein the carbon-based nanomaterial composition comprises an oxygen content of not greater than about 35% based on elemental analysis of the carbon-based nanomaterial composition.

Embodiment 70. The carbon-based nanomaterial composition or method of any one of embodiments 59, 60, and 61, wherein the carbon-based nanomaterial composition comprises a carbon hybridization ratio $P_{sp3}/P_{sp2}$ of at least about 1.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 71. The carbon-based nanomaterial-based cathode, carbon-based nanomaterial-based anode, or method of any one of embodiments 59, 60, and 61, wherein the carbon-based nanomaterial has a carbon hybridization ratio $P_{sp3}/P_{sp2}$ of not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 72. The carbon-based nanomaterial-based cathode, carbon-based nanomaterial-based anode, or method of any one of embodiments 59, 60, and 61, wherein the carbon-based nanomaterial composition comprises a D/G ratio of not greater than about 0.1.

Embodiment 73. The carbon-based nanomaterial-based cathode, carbon-based nanomaterial-based anode, or method of any one of embodiments 59, 60, and 61, wherein the carbon-based nanomaterial composition comprises a D/G ratio of at least about 2.0.

Embodiment 74. The carbon-based nanomaterial-based cathode, carbon-based nanomaterial-based anode, or method of any one of embodiments 59, 60, and 61, wherein the carbon-based nanomaterial composition comprises an aspect ratio of not greater than about 100.

Embodiment 75. The carbon-based nanomaterial-based cathode, carbon-based nanomaterial-based anode, or method of any one of embodiments 59, 60, and 61, wherein the carbon-based nanomaterial composition comprises an aspect ratio of at least about 1.

Embodiment 76. The carbon-based nanomaterial-based cathode, carbon-based nanomaterial-based anode, or method of any one of embodiments 59, 60, and 61, wherein the bromine doped nanospheres further comprises a secondary dopant.

Embodiment 77. The carbon-based nanomaterial composition or method of embodiment 76, wherein the secondary dopant comprises boron, chlorine, iodine, nitrogen, oxygen, phosphorous, silicon, silicon dioxide, sodium, or any combination thereof.

Embodiment 78. The carbon-based nanomaterial-based cathode, carbon-based nanomaterial-based anode, or method of any one of embodiments 59, 60, and 61, wherein the carbon-based nanomaterial composition is formed from a forming mixture, wherein the forming mixture comprises a gas mixture and a bromine precursor component.

Embodiment 79. The carbon-based nanomaterial-based cathode, carbon-based nanomaterial-based anode, or method of any one of embodiments 59, 60, and 78, wherein the forming mixture comprises the gas mixture at a concentration of at least about 50 vol. % for a total volume of the forming mixture.

Embodiment 80. The carbon-based nanomaterial-based cathode, carbon-based nanomaterial-based anode, or method of any one of embodiments 59, 60, and 78, wherein the forming mixture comprises the bromine precursor component at a concentration of not greater than about 98 vol. % for a total volume of the forming mixture.

Embodiment 81. The carbon-based nanomaterial-based cathode, carbon-based nanomaterial-based anode, or method of any one of embodiments 59, 60, and 78, wherein the forming mixture comprises the bromine precursor component at a concentration of at least about 2 vol. % for a total volume of the forming mixture.

Embodiment 82. The carbon-based nanomaterial-based cathode, carbon-based nanomaterial-based anode, or method of any one of embodiments 59, 60, and 78, wherein the forming mixture comprises the gas mixture at a concentration of not greater than about 50 vol. % for a total volume of the mixture.

Embodiment 83. The carbon-based nanomaterial-based cathode, carbon-based nanomaterial-based anode, or method of any one of embodiments 59, 60, and 78, wherein the gas mixture comprises the carbon-based gas at a concentration of at least about 0.8 mol.

Embodiment 84. The carbon-based nanomaterial-based cathode, carbon-based nanomaterial-based anode, or method of any one of embodiments 59, 60, and 78, wherein the gas mixture comprises the carbon-based gas at a concentration of not greater than about 4.0 mol.

Embodiment 85. The carbon-based nanomaterial-based cathode, carbon-based nanomaterial-based anode, or method of any one of embodiments 59, 60, and 78, wherein the carbon-based gas comprises Acetylene, Methane or any combination thereof.

Embodiment 86. The carbon-based nanomaterial-based cathode, carbon-based nanomaterial-based anode, or method of any one of embodiments 59, 60, and 78, wherein the gas mixture comprises oxygen gas at a concentration of at least about 0.1 mol.

Embodiment 87. The carbon-based nanomaterial-based cathode, carbon-based nanomaterial-based anode, or method of any one of embodiments 59, 60, and 78, wherein the gas mixture comprises oxygen gas at a concentration of not greater than about 1.0 mol.

Embodiment 88. The carbon-based nanomaterial-based cathode, carbon-based nanomaterial-based anode, or method of any one of embodiments 59, 60, and 78, wherein the gas mixture comprises hydrogen gas at a concentration of at least about 0.4 mol.

Embodiment 89. The carbon-based nanomaterial-based cathode, carbon-based nanomaterial-based anode, or method of any one of embodiments 59, 60, and 78, wherein the gas mixture comprises hydrogen gas at a concentration of not greater than about 1.6 mol.

Embodiment 90. The carbon-based nanomaterial-based cathode, carbon-based nanomaterial-based anode, or method of any one of embodiments 59, 60, and 78, wherein the gas mixture comprises methane gas at a concentration of at least about 0.8 mol.

Embodiment 91. The carbon-based nanomaterial-based cathode, carbon-based nanomaterial-based anode, or method of any one of embodiments 59, 60, and 78, wherein the gas mixture comprises methane gas at a concentration of not greater than about 2.4 mol.

Embodiment 92. The carbon-based nanomaterial-based cathode, carbon-based nanomaterial-based anode, or method of any one of embodiments 59, 60, and 78, wherein the gas mixture comprises methane gas at a concentration of at least about 0.8 mol.

Embodiment 93. The carbon-based nanomaterial-based cathode, carbon-based nanomaterial-based anode, or method of any one of embodiments 59, 60, and 78, wherein the gas mixture comprises methane gas at a concentration of not greater than about 2.4 mol.

Embodiment 94. The carbon-based nanomaterial-based cathode, carbon-based nanomaterial-based anode, or method of any one of embodiments 59, 60, and 61, wherein the carbon-based nanomaterial composition is formed at a combustion temperature of at least about 1500° C.

Embodiment 95. The carbon-based nanomaterial-based cathode, carbon-based nanomaterial-based anode, or method of any one of embodiments 59, 60, and 61, wherein the carbon-based nanomaterial composition is formed at a combustion temperature of not greater than about 3000° C.

Embodiment 96. The carbon-based nanomaterial-based cathode, carbon-based nanomaterial-based anode, or method of any one of embodiments 59, 60, and 61, wherein the carbon-based nanomaterial composition is formed at a combustion pressure of at least about 200 PSI.

Embodiment 97. The carbon-based nanomaterial-based cathode, carbon-based nanomaterial-based anode, or method of any one of embodiments 59, 60, and 61, wherein the carbon-based nanomaterial composition is formed at a combustion pressure of not greater than about 3000 PSI.

Embodiment 98. The carbon-based nanomaterial-based cathode, carbon-based nanomaterial-based anode, or method of any one of embodiments 59, 60, and 61, wherein the forming mixture further comprises a secondary dopant precursor component.

Embodiment 99. The carbon-based nanomaterial composition or method of embodiment 98, wherein the secondary dopant comprises a boron precursor component, a chlorine precursor component, an iodine precursor component, a nitrogen precursor component, an oxygen precursor component, a phosphorous precursor component, a silicon precursor component, a silicon dioxide precursor component, a sodium precursor component, or any combination thereof.

Embodiment 100. The carbon-based nanomaterial composition or method of any one of embodiments 1, 2, and 20, wherein the gas mixture comprises the carbon-based gas at molar ratio $CBG_{mol}/GM_{mol}$ of at least about 0.05 and not greater than about 0.7, where the $AG_{mol}$ is equal to the moles of acetylene gas in the gas mixture and $GM_{mol}$ is equal to the total moles of gas in the gas mixture.

Embodiment 101. The carbon-based nanomaterial composition or method of any one of embodiments 1, 2, and 20, wherein the gas mixture comprises oxygen gas at a molar ratio $OG_{mol}/GM_{mol}$ of at least about 0.01 and not greater than about 0.4, where the $OG_{mol}$ is equal to the moles of oxygen gas in the gas mixture and $GM_{mol}$ is equal to the total moles of gas in the gas mixture.

Embodiment 102. The carbon-based nanomaterial composition or method of any one of embodiments 1, 2, and 20, wherein the gas mixture comprises hydrogen gas at a molar ratio $HG_{mol}/GM_{mol}$ of at least about 0.01 and not greater than about 0.55, where the $HG_{mol}$ is equal to the moles of hydrogen gas in the gas mixture and $GM_{mol}$ is equal to the total moles of gas in the gas mixture.

Embodiment 103. The carbon-based nanomaterial composition or method of any one of embodiments 1, 2, and 20, wherein the gas mixture comprises acetylene gas at a molar ratio $AG_{mol}/GM_{mol}$ of at least about 0.05 and not greater than about 0.7, where the $AG_{mol}$ is equal to the moles of acetylene gas in the gas mixture and $GM_{mol}$ is equal to the total moles of gas in the gas mixture.

Embodiment 104. The carbon-based nanomaterial composition or method of any one of embodiments 1, 2, and 20, wherein the gas mixture comprises methane gas at a molar ratio $MG_{mol}/GM_{mol}$ of at least about 0.05 and not greater than about 0.7, where the $MG_{mol}$ is equal to the moles of methane gas in the gas mixture and $GM_{mol}$ is equal to the total moles of gas in the gas mixture.

Embodiment 105. The carbon-based nanomaterial-based cathode, carbon-based nanomaterial-based anode, or method of any one of embodiments 59, 60, and 61, wherein the gas mixture comprises the carbon-based gas at molar ratio $CBG_{mol}/GM_{mol}$ of at least about 0.05 and not greater than about 0.7, where the $AG_{mol}$ is equal to the moles of acetylene gas in the gas mixture and $GM_{mol}$ is equal to the total moles of gas in the gas mixture.

Embodiment 106. The carbon-based nanomaterial-based cathode, carbon-based nanomaterial-based anode, or method of any one of embodiments 59, 60, and 61, wherein the gas mixture comprises oxygen gas at a molar ratio $OG_{mol}/GM_{mol}$ of at least about 0.01 and not greater than about 0.4, where the $OG_{mol}$ is equal to the moles of oxygen gas in the gas mixture and $GM_{mol}$ is equal to the total moles of gas in the gas mixture.

Embodiment 107. The carbon-based nanomaterial-based cathode, carbon-based nanomaterial-based anode, or method of any one of embodiments 59, 60, and 61, the gas mixture comprises hydrogen gas at a molar ratio $HG_{mol}/GM_{mol}$ of at least about 0.01 and not greater than about 0.55, where the $HG_{mol}$ is equal to the moles of hydrogen gas in the gas mixture and $GM_{mol}$ is equal to the total moles of gas in the gas mixture.

Embodiment 108. The carbon-based nanomaterial-based cathode, carbon-based nanomaterial-based anode, or method of any one of embodiments 59, 60, and 61, wherein the gas mixture comprises acetylene gas at a molar ratio $AG_{mol}/GM_{mol}$ of at least about 0.05 and not greater than about 0.7, where the $AG_{mol}$ is equal to the moles of acetylene gas in the gas mixture and $GM_{mol}$ is equal to the total moles of gas in the gas mixture.

Embodiment 109. The carbon-based nanomaterial-based cathode, carbon-based nanomaterial-based anode, or method of any one of embodiments 59, 60, and 61, wherein the gas mixture comprises methane gas at a molar ratio $MG_{mol}/GM_{mol}$ of at least about 0.05 and not greater than about 0.7, where the $MG_{mol}$ is equal to the moles of methane gas in the gas mixture and $GM_{mol}$ is equal to the total moles of gas in the gas mixture.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A carbon-based nanomaterial composition formed from a forming mixture comprising a gas mixture and a bromine powder, wherein the gas mixture comprises a carbon-based gas, an oxygen gas, and a hydrogen gas, wherein the carbon-based nanomaterial composition comprises bromine doped nanospheres, and wherein the carbon-based nanomaterial composition comprises a carbon hybridization ratio $P_{sp3}/P_{sp2}$ of at least about 4.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

2. The carbon-based nanomaterial composition of claim 1, wherein the bromine doped nanospheres have an average diameter of at least about 5 nm.

3. The carbon-based nanomaterial composition of claim 1, wherein the bromine doped nanospheres have an average diameter of not greater than about 500 nm.

4. The carbon-based nanomaterial composition of claim 1, wherein the carbon-based nanomaterial composition comprises a bromine content of at least about 2 atomic (at. %) based on elemental analysis of the carbon-based nanomaterial composition.

5. The carbon-based nanomaterial composition of claim 1, wherein the carbon-based nanomaterial composition comprises a bromine content of not greater than about 50 at. % based on elemental analysis of the carbon-based nanomaterial composition.

6. The carbon-based nanomaterial composition of claim 1, wherein the carbon-based nanomaterial composition comprises a carbon content of at least about 60 at % based on elemental analysis of the carbon-based nanomaterial composition.

7. The carbon-based nanomaterial composition of claim 1, wherein the carbon-based nanomaterial composition comprises a carbon content of not greater than about 99 at. % based on elemental analysis of the carbon-based nanomaterial composition.

8. The carbon-based nanomaterial composition of claim 1, wherein the carbon-based nanomaterial composition comprises an oxygen content of at least about 1 at % based on elemental analysis of the carbon-based nanomaterial composition.

9. The carbon-based nanomaterial composition of claim 1, wherein the carbon-based nanomaterial composition comprises an oxygen content of not greater than about 35 at. % based on elemental analysis of the carbon-based nanomaterial composition.

10. The carbon-based nanomaterial composition of claim 1, wherein the carbon-based nanomaterial has a carbon hybridization ratio $P_{sp3}/P_{sp2}$ of not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

11. The carbon-based nanomaterial composition of claim 1, wherein the carbon-based nanomaterial composition comprises a D/G ratio of not greater than about 0.5.

12. The carbon-based nanomaterial composition of claim 1, wherein the carbon-based nanomaterial composition comprises a D/G ratio of at least about 2.0.

13. A method of forming a carbon-based nanomaterial composition, wherein the method comprises:

supplying a forming mixture comprising a gas mixture and a bromine powder, wherein the gas mixture comprises a carbon-based gas, an oxygen gas, and a hydrogen gas, igniting the gas mixture to form the carbon-based nanomaterial composition, wherein the carbon-based nanomaterial composition comprises bromine doped nanospheres, and wherein the carbon-based nanomaterial composition comprises a carbon hybridization ratio $P_{sp3}/P_{sp2}$ of at least about 4.0, where $P_{sp3}$ is the percent of carbon within the carbon-based nanomaterial composition having a sp3 hybridization and Paz is the percent of carbon within the carbon-based nanomaterial composition having a sp2 hybridization.

14. The method of claim 13, wherein the bromine doped nanospheres have an average diameter of at least about 5 nm.

15. The method of claim 13, wherein the bromine doped nanospheres have an average diameter of not greater than about 500 nm.

16. The method of claim 13, wherein the carbon-based nanomaterial composition comprises a bromine content of at least about 2 at. % and not greater than about 50 at. % based on elemental analysis of the carbon-based nanomaterial composition.

17. The method of claim 13, wherein the carbon-based nanomaterial composition comprises a carbon content of at least about 60 at. % and not greater than about 99 at. % based on elemental analysis of the carbon-based nanomaterial composition.

18. The method of claim 13, wherein the carbon-based nanomaterial composition comprises an oxygen content of at least about 1 at % and not greater than about 35 at. % based on elemental analysis of the carbon-based nanomaterial composition.

19. A carbon-based nanomaterial composition comprising:

bromine doped nanospheres, a carbon content of at least about 60 at. % and not greater than about 99 at. % based on elemental analysis of the carbon-based nanomaterial composition, an oxygen content of at least about 1 at. % and not greater than about 35 at. % based on elemental analysis of the carbon-based nanomaterial composition, and a bromine content of at least about 2 at % and not greater than 50 at %.

* * * * *